(12) United States Patent
Ruff

(10) Patent No.: US 9,130,492 B2
(45) Date of Patent: Sep. 8, 2015

(54) ANIMATRONIC SYSTEM WITH UNLIMITED AXES

(71) Applicant: John D. Ruff, Alexandria, VA (US)

(72) Inventor: John D. Ruff, Alexandria, VA (US)

(73) Assignee: Thermadyne, Inc., Alexandria, VA (US)

( * ) Notice: Subject to any disclaimer, the term of this patent is extended or adjusted under 35 U.S.C. 154(b) by 27 days.

(21) Appl. No.: 14/256,083

(22) Filed: Apr. 18, 2014

(65) Prior Publication Data

US 2014/0316567 A1    Oct. 23, 2014

Related U.S. Application Data

(60) Provisional application No. 61/814,393, filed on Apr. 22, 2013.

(51) Int. Cl.
| | | |
|---|---|---|
| *G05B 19/04* | (2006.01) | |
| *G05B 19/18* | (2006.01) | |
| *H02P 8/14* | (2006.01) | |

(52) U.S. Cl.
CPC ........................................ *H02P 8/14* (2013.01)

(58) Field of Classification Search
CPC ... G05B 19/409; G05B 19/0426; G05B 19/42
USPC ............ 700/245, 249, 253, 257, 264, 246, 1;
318/3, 4; 463/1, 43; 710/62; 910/19,
910/20, 23, 24
See application file for complete search history.

(56) References Cited

U.S. PATENT DOCUMENTS

| | | | | |
|---|---|---|---|---|
| 3,654,616 | A | * | 4/1972 | Dunne et al. ................ 700/88 |
| 4,300,198 | A | * | 11/1981 | Davini ........................ 700/264 |
| 5,074,821 | A | * | 12/1991 | McKeefery et al. .......... 446/299 |
| 5,240,417 | A | | 8/1993 | Smithson et al. |
| 5,784,541 | A | * | 7/1998 | Ruff ............................. 700/247 |
| 6,230,078 | B1 | * | 5/2001 | Ruff ............................. 700/247 |
| 6,377,281 | B1 | | 4/2002 | Rosenbluth et al. |
| 6,686,911 | B1 | | 2/2004 | Levin et al. |
| 7,439,699 | B1 | | 10/2008 | Earnest |
| 7,561,927 | B2 | | 7/2009 | Oyama et al. |
| 8,060,255 | B2 | | 11/2011 | Wieland |
| 8,368,700 | B1 | | 2/2013 | DiFrancesco et al. |
| 8,374,724 | B2 | | 2/2013 | Wieland et al. |
| 8,384,777 | B2 | | 2/2013 | Maguire, Jr. |
| 2002/0177920 | A1 | * | 11/2002 | Kasagami et al. ............ 700/170 |
| 2002/0184674 | A1 | * | 12/2002 | Xi et al. ........................ 901/9 |
| 2003/0024796 | A1 | * | 2/2003 | Peterson et al. ............. 200/11 R |
| 2004/0219861 | A1 | * | 11/2004 | Madhani et al. ............. 446/355 |
| 2006/0106494 | A1 | * | 5/2006 | Alvarez et al. ............... 700/251 |
| 2009/0292165 | A1 | * | 11/2009 | Sugiyama et al. ........... 600/106 |
| 2010/0144239 | A1 | | 6/2010 | Eck et al. |

* cited by examiner

*Primary Examiner* — Khoi Tran
*Assistant Examiner* — Jorge Peche
(74) *Attorney, Agent, or Firm* — Edell, Shapiro & Finnan, LLC

(57) ABSTRACT

In an animatronic system, recording and playing performances of individual axes of character movement involves, during recording, continually commanding speeds and rotational directions of a stepping axis motor in response to manual movement of a joystick. The joystick commands are modified by means of a feedback motor electrically coupled to the axis motor to mechanically interact with the joystick.

16 Claims, 16 Drawing Sheets

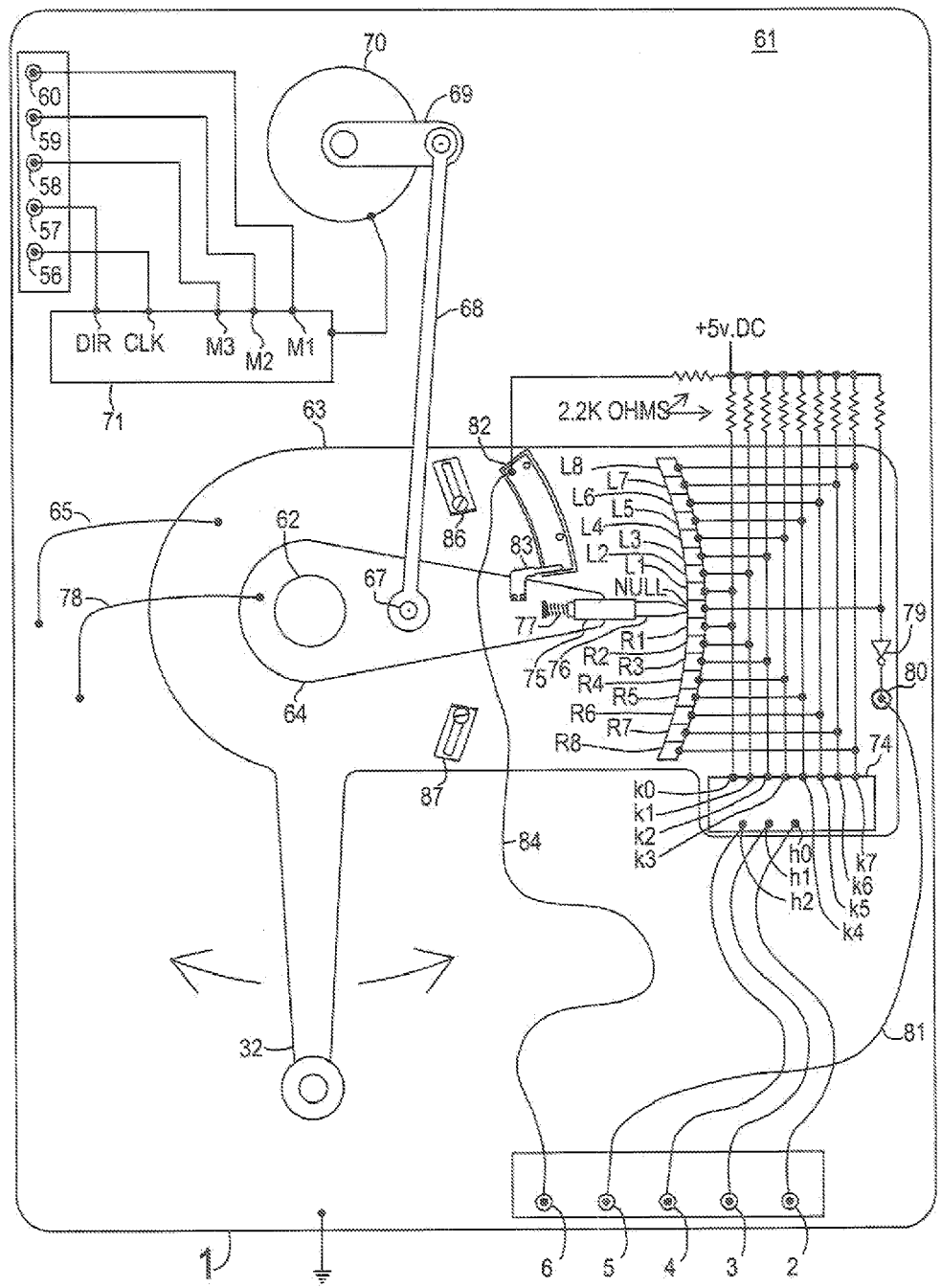

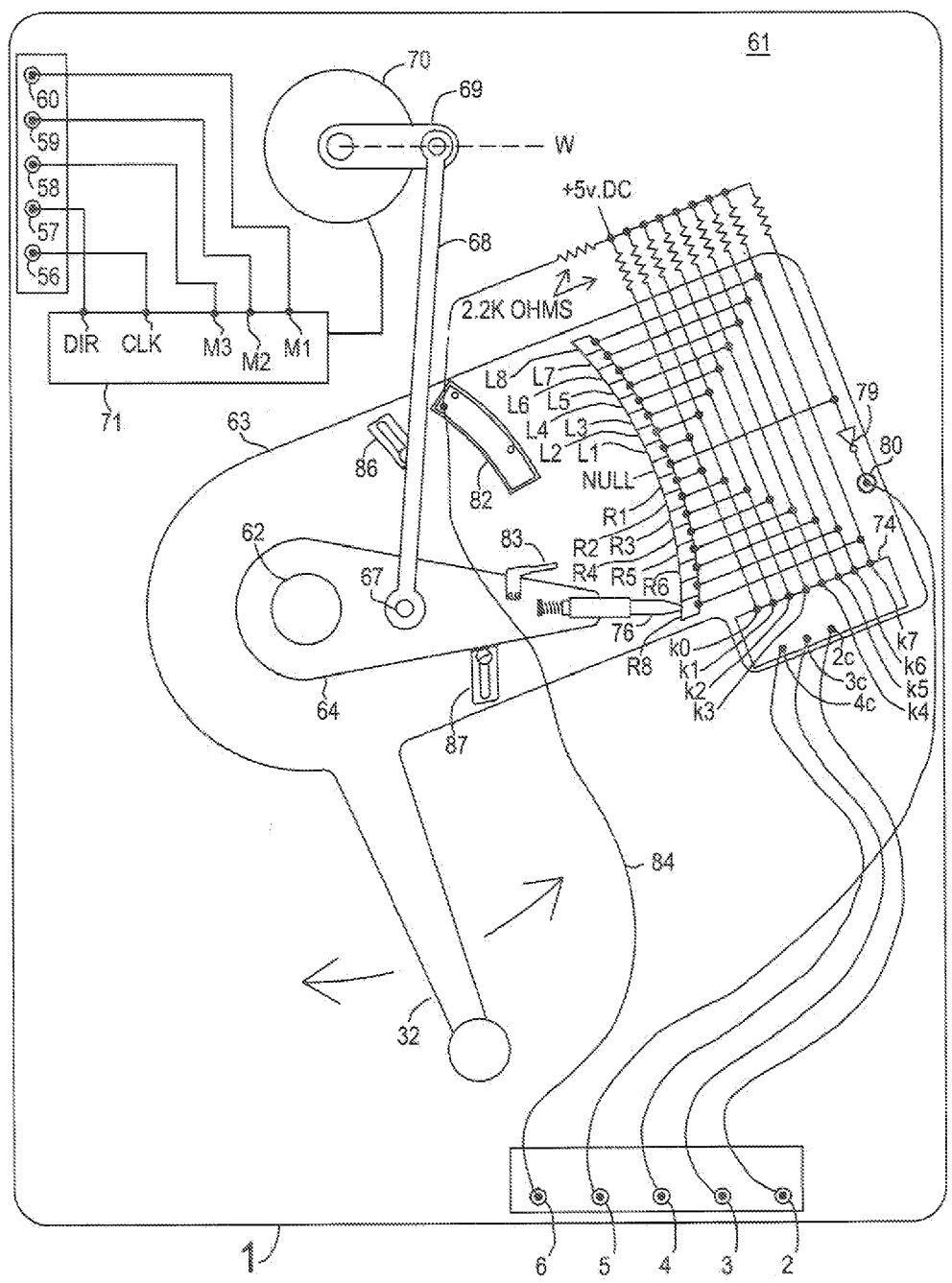

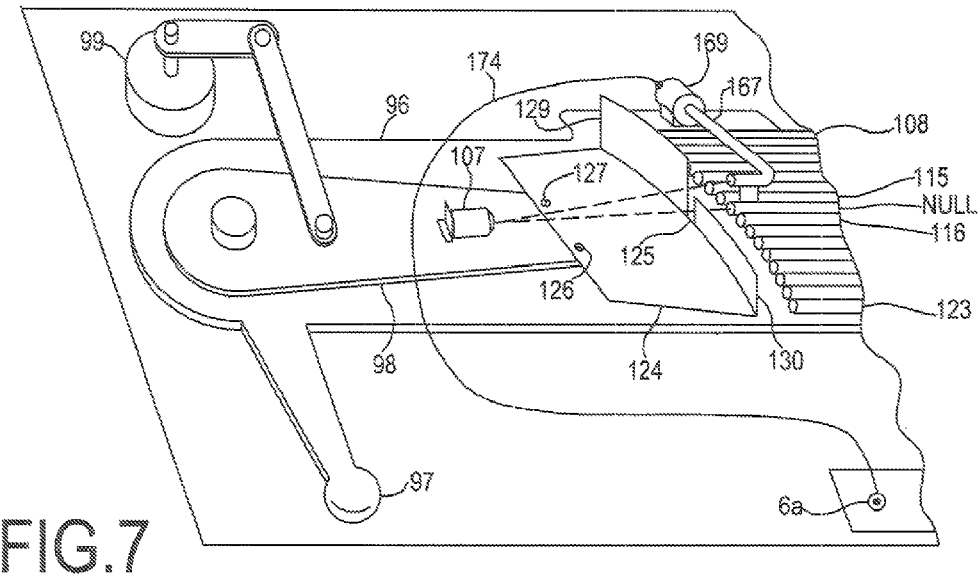
FIG.7
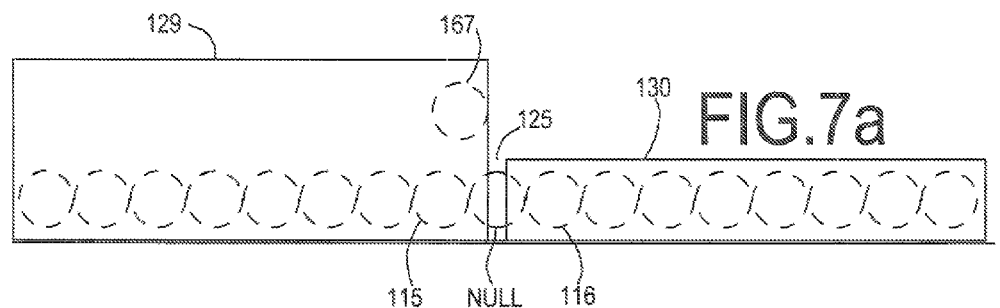
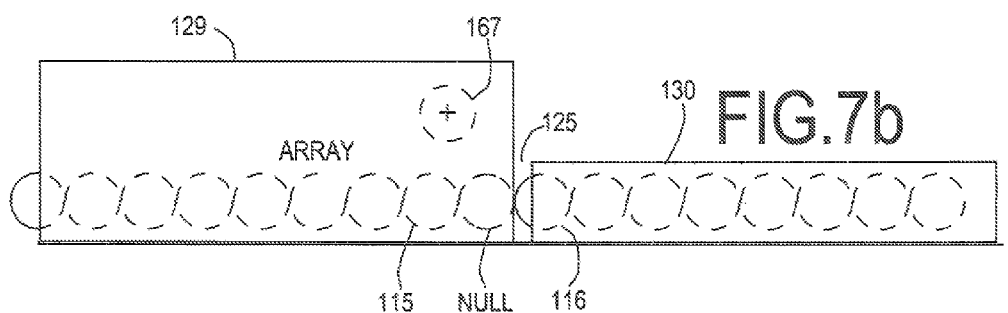

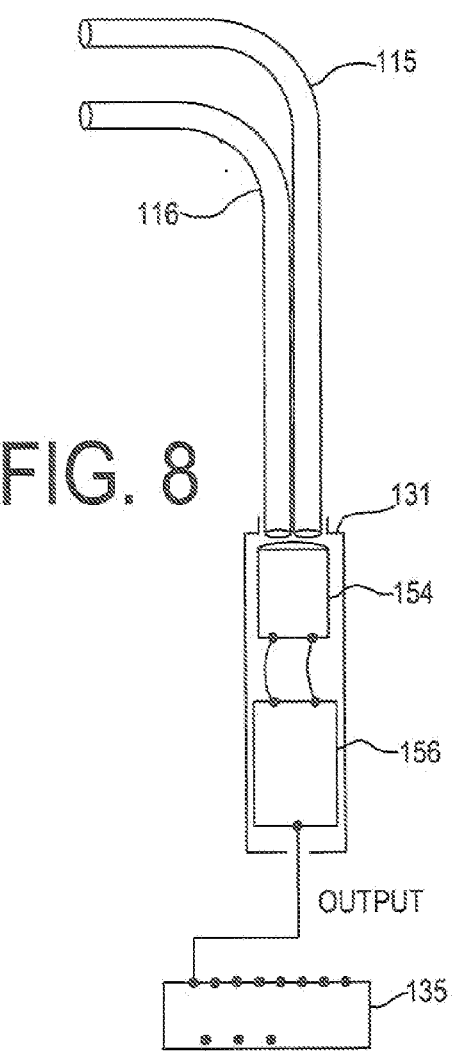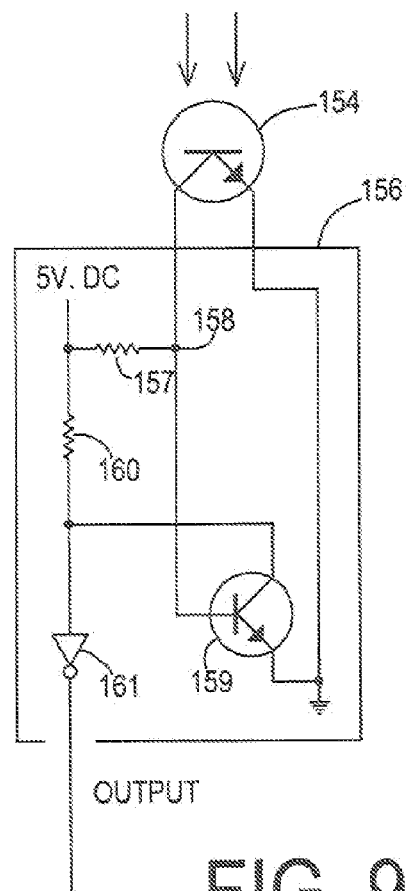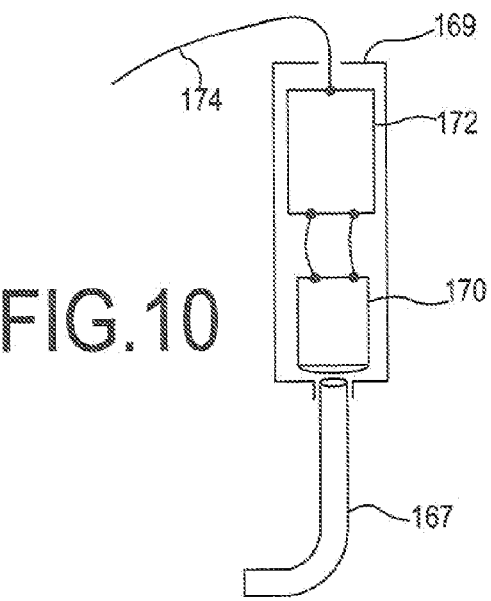

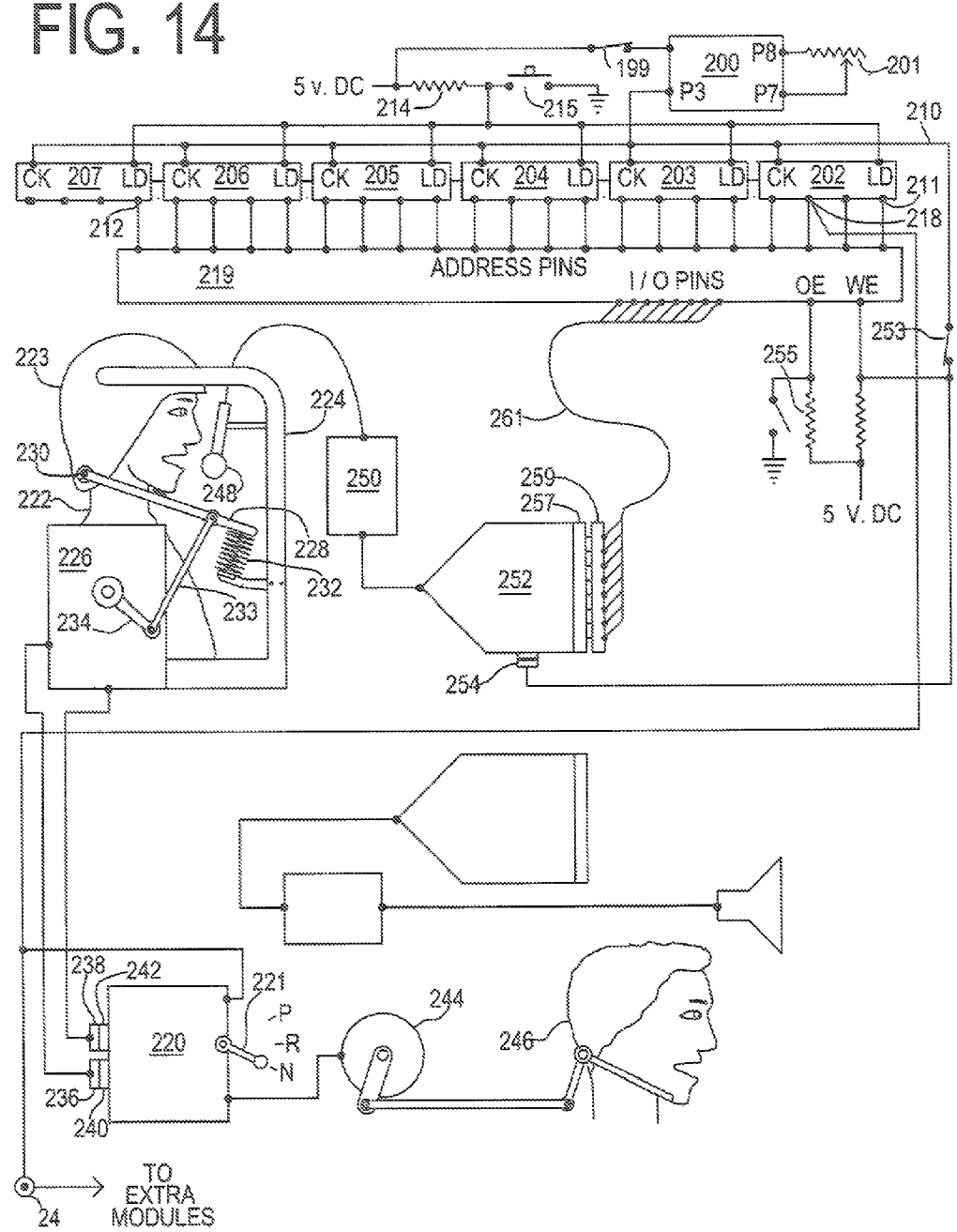

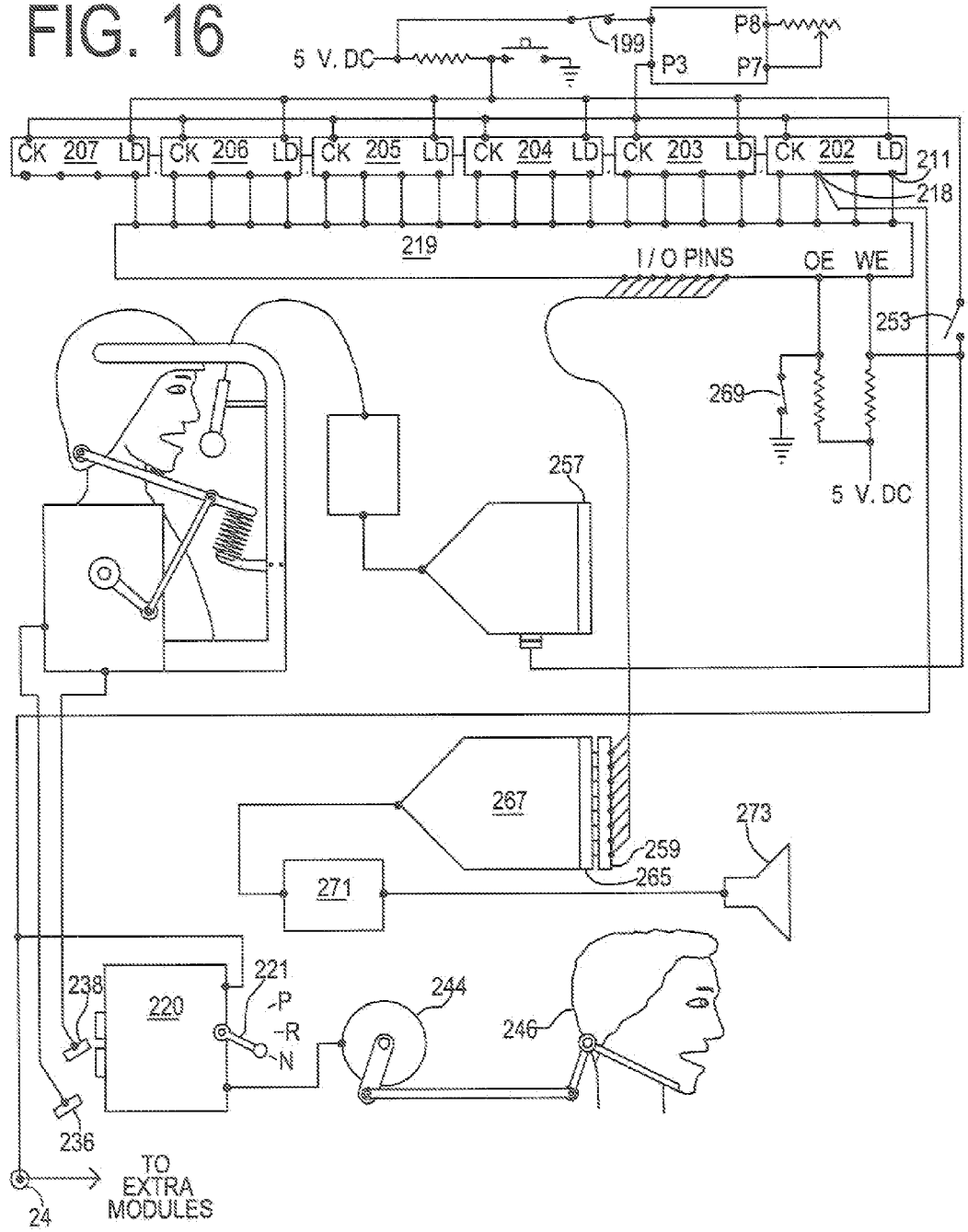

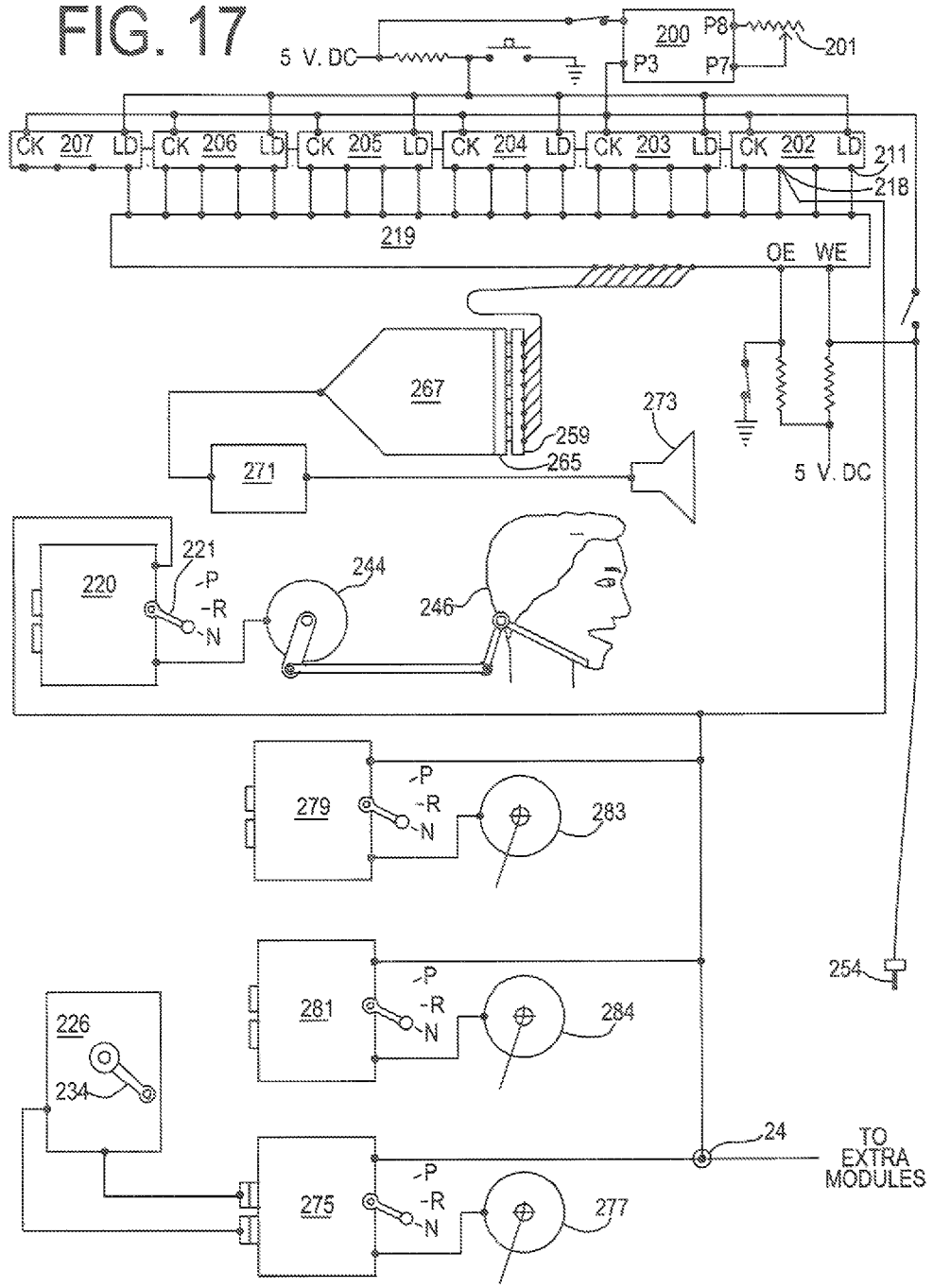

ANIMATRONIC SYSTEM WITH UNLIMITED AXES

CROSS REFERENCE TO RELATED APPLICATIONS

This application claims priority to U.S. Provisional Application No. 61/814,393, filed Apr. 22, 2013 and entitled "Animatronic system with unlimited axes", the entirety of which is incorporated herein by reference.

FIELD OF THE INVENTION

The present invention pertains to animatronic control systems of the general type disclosed in my U.S. Pat. Nos. 5,784,541 and 6,230,078; the entire disclosures in those patents are incorporated herein by reference.

BACKGROUND

Existing animatronic control systems are typically of the closed loop servo-motor type, with the data controlling the movement relative to multiple axes saved in computer files, and processed by complex software. The present invention offers some advantages over those systems, such as the ability to function with an unlimited number of axes, and, depending on the scale of construction, substantially reduced expense. In addition, the system of the present invention is completely self-contained and has a greater capability of editing scripts that have been recorded. Further, the present invention has the improved ability to review and edit pre-recorded performances at slower and more leisurely speeds, and the ability to run the editing performance in a backward direction, thus allowing skilled puppeteers to edit and buildup a more detailed and expressive recorded performance, especially as regards slight expressive movements of eyes, mouth, neck and shoulders

OBJECTS AND SUMMARY

One object of the present is to provide stepping motor powered animatronic system for recording and playing performances of individual axes of movement wherein, during recording, a joystick continually commands the speeds and rotational directions of the axis motor. A feedback motor, electrically coupled to the axis motor, repeatedly, at imperceptivity short intervals, mechanically interacts with the joystick to modify and properly terminate the joystick commands.

Another object of the invention is to provide a method for recording and playing performances of individual axes of movement wherein, during recording, a joystick continually commands the speeds and rotational directions of the axis motor, and wherein a feedback motor, electrically coupled to the axis motor, repeatedly, at imperceptivity short intervals, mechanically interacts with the joystick to modify and properly terminate the joystick commands.

Another object aspect of the invention is to provide an apparatus for controlling an electric stepping axis motor which responds to a plurality of different control settings corresponding to binary words of a predetermined set of binary data. The apparatus includes a storage file for storing a plurality the binary data, a memory for storing the file, a pulse source for issuing each of the plurality of binary words from the memory at predetermined evenly spaced time intervals, and an interface for decoding the binary words from the memory and controlling electric stepping axis motor in accordance with the control settings corresponding to said binary word. A joystick is provided for selecting control setting commands consistent with desired speed and direction of the stepping axis motor. A feedback stepper motor interacts mechanically within the joystick to cancel previous control setting commands. The feedback stepper motor includes control wiring coupling the feedback stepper motor to rotate in unison with electric stepping axis motor. An encoder encodes the control setting commands into binary words at evenly spaced intervals, and switching circuitry saves the binary words to the storage file for saving in the memory at the evenly spaced time intervals.

A further object of the invention is to provide an animatronic system comprising a stepping axis motor responsive to variable control signals for controlling animation of a character, a memory for storing said control signals which are activated at predetermined evenly spaced time intervals and decoded to control the stepping axis motor, and a joystick unit for selecting control setting commands consistent with desired speed and direction of the stepping axis motor and including a feedback stepper motor for interacting mechanically within said joystick unit to cancel previous control setting commands. The feedback stepper motor includes means coupling it to rotate in unison with the stepping axis motor, an encoder for encoding the control setting commands into command signals at evenly spaced interval, and switching means for saving the command signals to the memory at the evenly spaced intervals.

The aforesaid objects are achieved individually and in combination, and it is not intended that the present invention be construed as requiring two or more of the objects to be combined unless expressly required by the claims attached hereto.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

FIG. 2 is a combination mechanical and electrical schematic illustration of the joystick controlled encoding unit of FIG. 1 using direct electrical contacts according to an aspect of the present invention.

FIG. 3 is a combination mechanical and electrical schematic illustration of the joystick controlled encoding unit of FIG. 2 shown in a different rotational position.

FIG. 7 is a perspective view of the optical encoder of FIG. 5.

FIGS. 7*a* and 7*b* are frontal views in elevation of the fiber optic array of FIG. 7 in different operational conditions.

FIG. 8 is a diagrammatic illustration of the optical sensor of FIG. 7.

FIG. 9 is an electrical schematic diagram of a light sensor and amplifier used with the optical sensor of FIG. 7.

FIG. 10 is a schematic illustration of an optical receiver used with the optical sensor of FIG. 7.

FIG. 14 is a schematic illustration of the master clocking system and audio/animatronic motion capture arrangement used in the present invention.

FIG. 16 is an illustration of an audio/animatronic system in playback mode.

FIG. 17 shows an arrangement for recording multiple animatronic axes according to the present invention.

DETAILED DESCRIPTION

General comments: The integrated circuits (ICs) described and illustrated herein are preferably CMOS units operating with a 5 v DC power supply. All unused inputs are grounded or held high, and other conventional measures are taken. TTL or any other type of equivalent IC devices can alternatively be used, and FPGA, ASIC, or any other devices which can provide the equivalent combinations of logic gates can be used.

Figure 1:
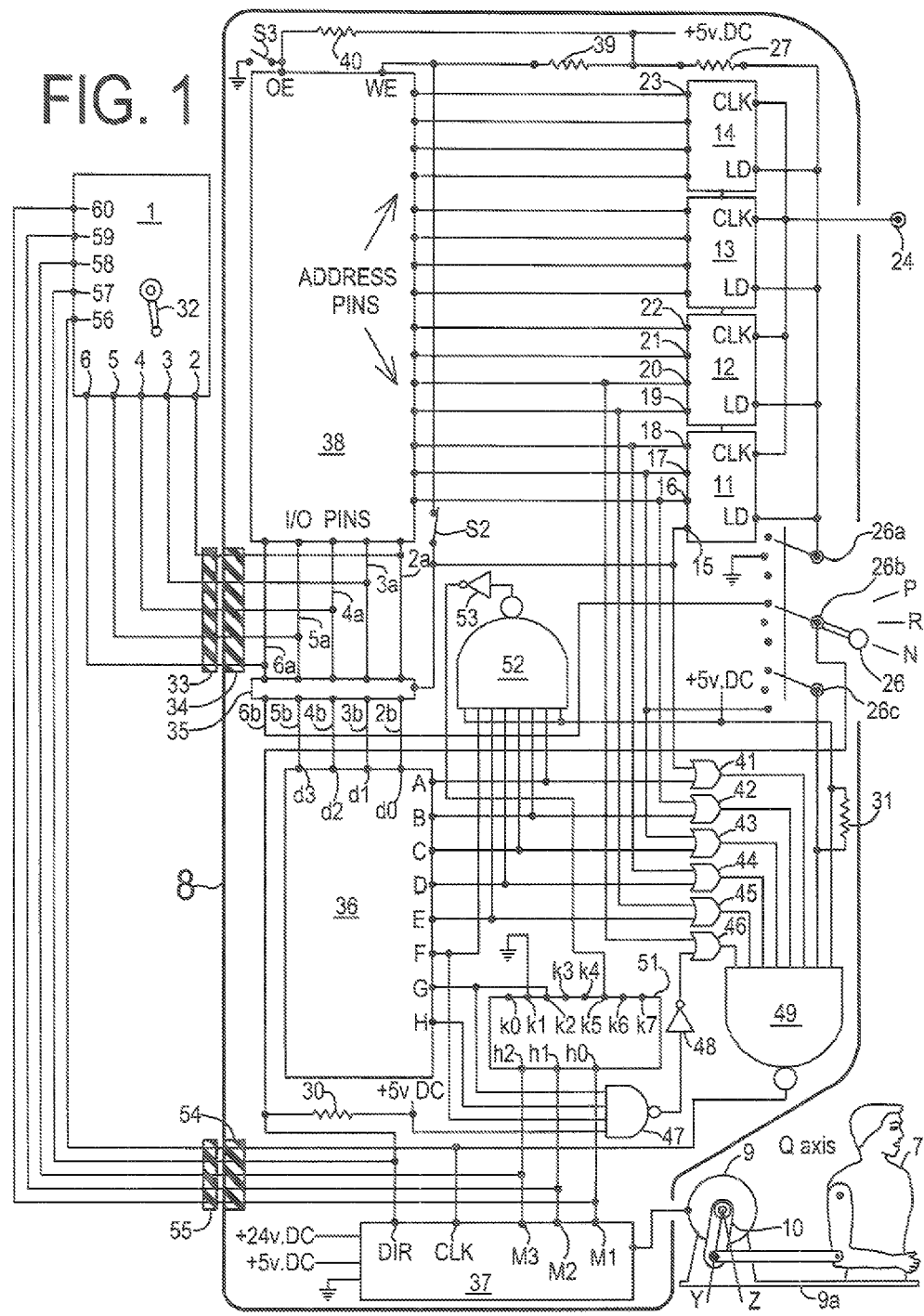
FIG. 1 is a schematic electrical circuit diagram of the basic control module for a single axis motor according to the present invention.

Referring to FIG. 1 of the accompanying drawings, there is illustrated the functioning of the system of a preferred embodiment of the present invention during a session in which encoding unit 1 sends binary data from data output terminals 6, 5, 4, 3, 2 to be recorded. These data control the movements along or about the "Q" axis of an animated character 7. The "Q" axis of animation provides movement of the arm of character 7. During the described recording session an actual animation of character 7 takes place to allow operators to monitor the effects of their manipulation of encoding unit 1. Control module 8 comprises the assembly of components and circuitry for implementing the rotations of a stepping motor in the "Q" axis direction. Axis motor 9 is preferably a unipolar stepping motor, although alternatively a bipolar motor could be used with an appropriate bipolar motor driver. Character 7 and axis motor 9 are mounted on a common base 9*a*. Axis motor 9 has a control arm 10 attached to its shaft and connected to the arm of character 7 so that rotation of axis motor 9 causes the arm to move. Counters 11, 12, 13, 14 (for example, 74HC191 counter ICs) are cascaded, and their outputs provide a frequency divider network with sixteen square wave, 50% duty cycle, signal sources. Counter 11 provides outputs at sources 15, 16, 17, 18, with the highest frequency output coming from source 15. Counter 12 provides sources 19, 20, 21, 22, and counters 13, 14 provide sources with frequencies in descending order down to source 23. Counters 11, 12, 13, 14 are clocked at their CLK inputs by a signal from clock terminal 24 which is a signal source external to module 8, and part of the greater master clock system (as shown in detail in FIG. 14). A typical signal frequency from clock terminal 24 is 1,920 Hz. This results in a frequency of 960 Hz at source 15, 480 Hz at source 16, 240 Hz at source 17, and down to 0.0292 Hz (approximately) at source 23. Frequencies described herein pertain to typical examples of workable versions of the invention and are not limiting on the scope of the invention.

The LD (load) pins of counters 11, 12, 13, 14 are connected to three position reset switch 26*a* and held high by 2.2K ohm resistor 27. Switches 26*a*, 26*b* and 26*c* are ganged together and actuated by switch lever 26. The operating positions of the ganged switch lever 26 are:

(a) N (normal), as shown in FIG. 1.
(b) R (reset, standby).
(c) P (positioning).

Switch 26*a* is shown in the N position which is used in normal recording and playback operation. When it is moved to the R position switch 26*a* grounds the LD pins and resets (clears) the counters. Position P is used to position the motors prior to starting a recording or replay session, as described below.

Figure 1A:
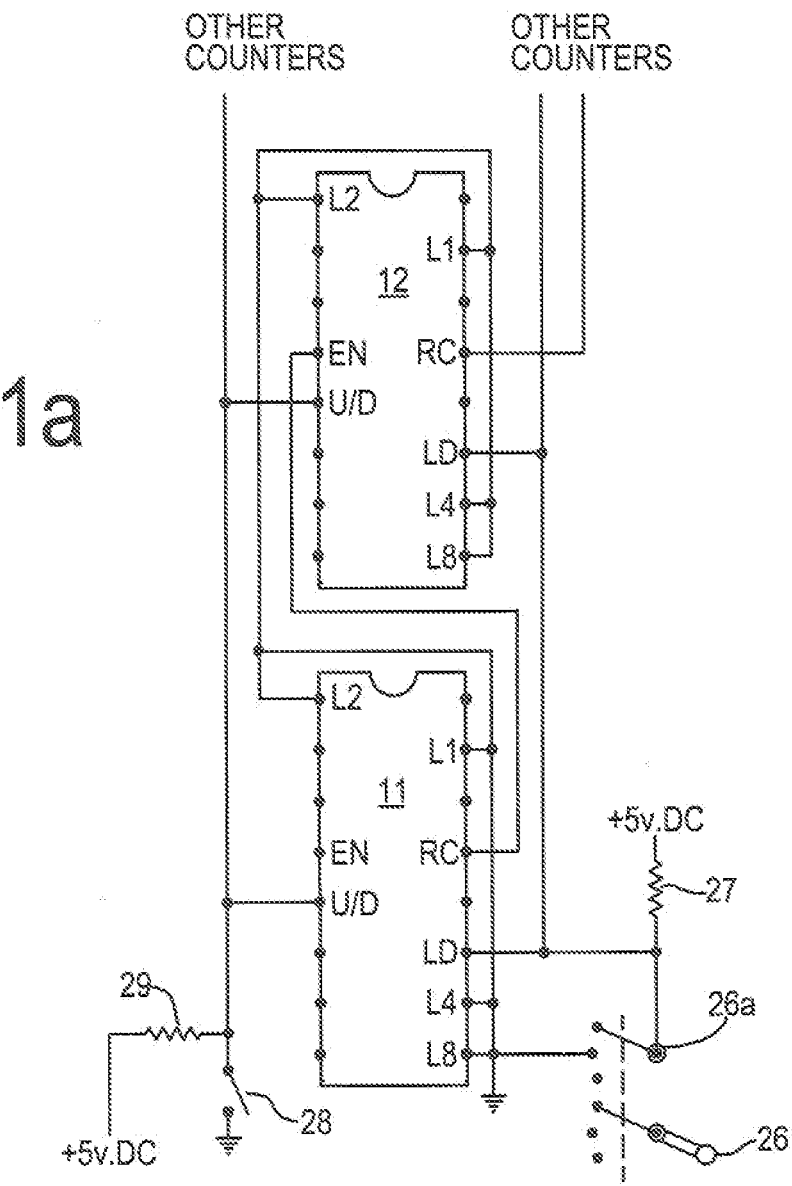
FIG. 1a is a schematic diagram of connections to a counter shown in FIG. 1.

FIG. 1*a* is a detailed view of counters 11 and 12, showing how the L1, L2, L4, L8 (load input) pins are grounded, and how switch 26*a* enables the reset function. Switch 28 and a 2.2K ohm resistor 29 are used to set the counters to count up or down. Cascading of the counters is achieved by connecting the ripple clock output (RC) pin of each counter to the enable (EN) pin of the following counter in the sequence.

Encoding unit 1 (FIG. 1) is manually operated by rotations of joystick 32, resulting in binary data signals defining the rotation speed of axis motor 9 being sent from data output terminals 5, 4, 3, 2 through plug 33, socket 34, and data lines 5*a*, 4*a*, 3*a*, 2*a* to input pins of memory 35 (for example, a 74HC174 IC). Similarly, data output terminal 6 sends data signals through plug 33, socket 34 and data line 6*a* to an input pin of memory 35 to define the direction of rotation of axis motor 9. Memory 35 is clocked at regularly repeated intervals (typically 1.04 milliseconds) by a "timing pulse" comprised of the high-going signals from the 960 Hz source 15. At each clocking, the speed and direction data coming from encoding unit 1 at the instant of clocking is saved in memory 35 and remains present at the output pins until the next clocking, at which time it may be changed, or remain unchanged, depending on input data. The rotation speed data thusly saved are sent from the output pins of memory 35 on output lines 5*b*, 4*b*, 3*b*, 2*b* to the input pins d3, d2, d1, d0 of decoder 36 (for example, a 74HC42 IC). The direction data saved in memory 35 are sent on line 6*b*, through switch 26*b* (in the closed position), to the direction pin (DIR) of motor driver 37. Driver 37 is, for example, an Allegro/SanKen 7075 MR unipolar stepping motor driver with a 5 v DC input for logic supply, and a 24 v DC power supply for energizing axis motor 9. The data from line 6*b* are interpreted by motor driver 37 to cause axis motor 9 to run in either clockwise or counter-clockwise directions.

Also occurring at every clocking of memory 35 in a recording session, the same high-going signal from source 15 is applied through switch S2 (in the closed position) to the WE (write) pin of memory 38, causing the data saved in memory 35 through data lines 6a, 5a, 4a, 3a, 2a to be simultaneously saved in memory 38 through five of the I/O pins. A 2.2K ohm resistor 39 connects the WE (write) pin to +5 v DC to keep it high during playback when switch S2 is open as described below in detail in relation to FIG. 15. During recording, the OE (output enable) pin is held high by 2.2K resistor 40. Memory 38 is, for example, a Benchmarq bq4011, NVS-RAM, with eight I/O pins (with only five being used). Alternatively, any other suitable non-volatile memory type may be used.

As clocking of counters 11, 12, 13, 14 proceeds, signal sources 16, 17, 18, 19, 20, 21, 22-23 provide a series of binary addresses, which are applied to the address pins of memory 38. In this manner memory 38 saves data at 32,768 successive addresses, and with clocking at a rate of 960 Hz, a recording time of approximately thirty-four seconds can be achieved. Larger memories can be used for much longer times. By using a 2M×8 NVSRAM a recording time of approximately thirty-eight minutes is available. It should be noted that source 15 is not used as one of the address connections because it is used as the clock for memories 35 and 38, and in that capacity it causes one save for each square wave cycle; therefore, if it were also used as an address connection, it would cause two address changes per cycle, which is unsuitable. Thus, the highest speed address connection that can be used is source 16, which matches the required "one address change per clocking" of the memories.

After each clocking of the memories the input data at the decoder 36 inputs cause selection of a single one of eight output pins A, B, C, D, E, F, G, H which define motor speeds, in descending order of magnitude. The selected pin then goes low. Pin A represents the highest motor speed, and pin H represents the lowest speed. Each of the output pins A, B, C, D, E is connected directly to one of the inputs of each of the OR gates 41, 42, 43, 44, 45 (for example, 74HC32 ICs). Output pin F is connected to one of the inputs of OR gate 46, through four-input NAND gate 47 (for example, a 74HC10, IC, with one unused input held high), and inverter 48. The other inputs of gates 41, 42, 43, 44, 45, 46 are connected to signal sources 15, 16, 17, 18, 19, 20 respectively. When any one of decoder 36 output pins goes low, the associated OR gate provides a signal of the same frequency as the signal source to which its other input is co-connected. For example: if the data from memory 35 represents the highest motor speed, pin A will be selected, which causes OR gate 41 to output the 960 Hz signal of the connected signal source 15. The output of this 960 Hz signal continues uninterrupted as long as the data at 5a, 4a, 3a, 2a remain unchanged, even through periods in which additional clocking of memory 35 might occur. During this time the outputs of the other gates (42, 43, 44, 45, and 46) remain high. The outputs of the six OR gates are connected to six of the inputs of eight-input NAND gate 49 (for example, a 74HC30 IC). When any one of the OR gates outputs a pulsing signal, NAND gate 49 sends a signal of that frequency to the CLK (clock input) of motor driver 37, causing axis motor 9 to run at the designated speed while receiving that signal. Gate 49 has one unused input held high, with a remaining input connected to switch 26c, shown in the normal (N) position (open), with 2.2K ohm resistor 31 pulling the input high.

In addition to controlling motor speed by varying the clock frequency as described above (with frequencies being controlled directly from pins A, B, C, D, E, F), pins G and H provide two additional stages of low speed variation which utilize the micro-step capability of motor driver 37 without changing the signal frequency. While using pins G and H this frequency remains the same as it was when selected by decoder pin F. When any of decoder pins F, G, H are selected they cause four-input NAND gate 47 to output to inverter 48, which causes OR gate 46 to combine with source 20 to send a 30 Hz signal to eight-input NAND gate 49, thence to the CLK pins of motor driver 37. The micro-stepping function of motor driver 37 is controlled by data from output pins h2, h1, h0 of encoder 51 being applied to pins M3, M2, M1 of motor driver 37. Encoder 51 is, or example, a SN74HC148 IC. Reference is made to the function table in Texas Instruments SN74HC148 data sheet in which the designated inputs 0, 1, 2, 3, 4, 5, 6, 7 correspond with the inputs k0, k1, k2, k3, k4, k5, k6, k7 of encoder 51. This function table also designates data outputs A2, A1, A0 which correspond to output pins h2, h1, h0 of encoder 51 Activation (by grounding) of inputs k1, k2, k3, k5, k7 produce output data which produce micro-steps of: sixteenth, eighth, quarter, half, and full steps, respectively, when the resulting output data are applied to pins M3, M2, M1 of motor driver 37. Reference is made to the truth tables in the Allegro/SanKen SLA7070M Motor Driver Product Description. The present system uses sixteen micro-steps for the lowest speed, so input k1 is grounded, which causes a sixteen micro-step action if no higher priority input is selected. Encoder 51 is a priority encoder and input k1 is the lowest priority used. Thus, when higher priority inputs are employed by activation of the decoder pins for speeds higher than pin H, correspondingly larger micro-steps result.

For the second lowest speed the system uses eight micro-steps, so pin G is connected to input k2. Pins A, B, C, D, E, F are connected to six of the inputs of eight-input NAND gate 52 which outputs to inverter 53, which outputs to encoder 51 input k5. Thus, when any of these six higher speeds are selected, gate 52 will output high and inverter 53 will output low to activate input k5, making these six speeds run in half-step mode. Other choices of the use of micro-step connections, or of other types of micro-stepping drivers, could be made as design decisions.

Connections are made from the DIR, CLK, M3, M2, M1 terminals of motor driver 37, through socket 54 and plug 55 to terminals 56, 57, 58, 59, 60 in encoding unit 1, to provide the feedback function which is described below in relation to FIG. 2.

Encoding Unit (Electrical Contact Type)

Refer now to FIG. 2 showing details of encoding unit 1 which uses metal base 61 for mechanical support of components. Metal base 61 has an electrical ground in common with the ground used by components of module 8 (shown in FIG. 1). Axle 62 is attached and perpendicular to metal base 61. Turntable 63 rotates about axle 62 and is manipulated by joystick 32. Contact arm 64 also rotates about axle 62 and moves independently to turntable 63. Turntable 63 and contact arm 64 are both of metal construction. Turntable 63 is grounded to metal base 61 by a flexible cable 65. Crankpin 67 is attached to contact arm 64 and is connected by connecting rod 68 to control arm 69 on the shaft of feedback motor 70 which is mounted on metal base 61. Feedback motor 70 is driven by feedback motor driver 71 which is similar to motor driver 37 (FIG. 1). Rotation of motor 70 causes movement of connecting rod 68 which causes rotation of contact arm 64. The clock (DIR), direction (CLK), and micro-stepping control (M3, M2, M1) inputs of feedback motor driver 71 are connected to terminals 56, 57, 58, 59, 60, respectively, thus linking the control inputs of feedback motor driver 71 to the inputs of motor driver 37 (FIG. 1). This linking causes axis motor 9 and feedback motor 70 to run in unison at all times. Therefore, for simplicity and ease of understanding the following description, whenever describing such matched motor speeds or directions of rotation, reference is made only to "the motors".

Contact segments L8, L7, L6, L5, L4, L3, L2, L1, NULL, R1, R2, R3, R4, R5, R6, R7, and R8 are mounted on turntable 63, and are insulated from it and each other. The curved surfaces of these segments that face contact arm 64 are aligned to lie in a continuous arc concentric to axle 62. Segments L8, L7, L6, L5, L4, L3, L2, and L1 are electrically connected to respective segments R8, R7, R6, R5, R4, R3, R2, R1. Segments L8, L7, L6, L5, L4, L3, L2, L1 are also connected to respective inputs k7, k6, k5, k4, k3, k2, k1, k0 of encoder 74 (for example, a 74HC148 priority encoder). Reference is made to the function table in Texas Instruments SN74HC148 data sheet in which the designated inputs 0, 1, 2, 3, 4, 5, 6, 7 correspond respectively to the inputs k0, k1, k2, k3, k4, k5, k6, k7 of encoder 74, and designated outputs A2, A1, A0 correspond respectively to output pins h2, h1, h0 of encoder 74. Inputs k0, k1, k2, k3, k4, k5, k6, k7 are individually held normally high by 2.2K ohm resistors connected to +5 v DC. A bushing 75 is attached to contact arm 64, and metal contactor pin 76 slides freely in bushing 75 and is electrically grounded to contact arm 64 by spring 77. As it rotates in an arc concentric to axle 62, contactor pin 76 is forced by spring 77 to make sliding contact with the curved surfaces of segments L8, L7, L6, L5, L4, L3, L2, L1, NULL, R1, R2, R3, R4, R5, R6, R7, R8, effectively grounding whichever segment (or segments) it is in contact with at any given time, thus selecting input connections to encoder 74; with the exception of the NULL segment which is not connected to encoder 74. When a contact with the NULL segment is held, it causes the motors to remain stopped as described below. Contact arm 64 is grounded to metal base 61 by flexible cable 78.

When any one of segments L8, L7, L6, L5, L4, L3, L2, L1, R1, R2, R3, R4, R5, R6, R7, R8 is grounded, it brings the input pin of encoder 74 to which it is connected to a low input condition, and the binary word representing that input selection is present at the output pins h2, h1, h0 of encoder 74. This word is sent through flexible cables to be present at terminals 4, 3, 2 to control the speed of rotation of axis motor 9, as described in connection with FIG. 1. Segments R8 and L8 are used to activate the highest speed and are connected to input k7, which is the highest priority input of encoder 74. Segment R8 is activated when joystick 32 is rotated counter clockwise, and segment L8 is activated when joystick 32 is rotated clockwise. Segments R1 and L1 are similarly used to activate the lowest speed, and are connected to input k0 which is the lowest priority input of encoder 74. Intermediate speeds are activated in the order of magnitude of their reference numbers. When two adjacent segments are grounded at the same time, the binary word associated with the higher priority input (i.e., higher speed) is present at the output. It is important that the contact area of the face of contact pin 76 is wide enough so that when it is moving from one segment to another it retains the contact with the first segment until after it contacts the next segment contacted.

Encoder 74 includes eight inputs and a three-bit binary output; thus, to provide the additional encoding capacity needed to include the NULL position in a binary word defining the required speeds, the NULL segment is connected through an inverter 79, and through insulated standoff 80 and flexible wire 81 to terminal 5, thereby providing the most significant bit of a four-bit word (defining the motor speeds) at the output terminals 5, 4, 3, 2.

Direction Control

Contactor plate 82 is attached to, and insulated from, turntable 63 at a level lower than the underside of contact arm 64 so that contact arm 64 can rotate above contactor plate 82 without touching it. Finger 83 is attached and electrically connected to contact arm 64 and is shaped to make a sliding electrical contact with contactor plate 82. In the NULL position shown in FIG. 2, finger 83 is shown contacting contactor plate 82 in a position close to its end, so that any clockwise rotation of turntable 63 relative to contact arm 64 causes finger 83 to continue to make contact with contactor plate 82, grounding it and holding it low. Also, from this shown NULL position, any counterclockwise rotation of turntable 63 relative to contact arm 64 causes a separation of finger 83 from contactor plate 82, allowing a 2.2K resistor to connect to +5 v DC to bring it high. Contactor plate 82 is connected by flexible wire 84 to data output terminal 6. By means of the above described process, data is provided at data output terminal 6 to define the direction of rotation of the motors. This method provides that at any time contactor pin 76 is in position to contact with any of segments R1 through R8, terminal 6 will be high (for counter clockwise rotation). Positions for contact of contactor pin 76 with segments L8 through L1 bring terminal 6 low (for clockwise rotation).

Refer now to FIG. 1 where terminal 6 of encoding unit 1 is also represented, and then continue tracing a low state from terminal 6 through plug 33, socket 34, data line 6a, memory 35, output line 6b, switch 26b and to the DIR input of motor driver 37, which is configured for clockwise rotation of the motors when receiving a low signal on its DIR input. The preceding describes how any clockwise rotation of joystick 32 causes a clockwise rotation of the motors. Counter clockwise rotation of joystick 32 has the opposite effect.

Adjustable stops 86 and 87 (see FIG. 2) are used to restrict the travel of contact arm 64 relative to turntable 63.

The following are detailed examples of the system operation during a recording session, with combined references to FIG. 1, FIG. 2, FIG. 3 and FIG. 4. With power applied to all components, the above described repeated clocking of memories 35 and 38 (FIG. 1) commences, and recording begins. Referring to FIG. 2, there is no control input pressure on joystick 32 during the initial period of this example (which shows a stopped condition), and contactor pin 76 is in contact with the NULL segment, causing it to be continuously low (grounded). This low state signal is conveyed through inverter 79, which conveys a high state through insulated standoff 80 and flexible cable 81, to data output terminal 5, thus providing binary one as the most significant bit at the data output terminals 5, 4, 3, 2. Since contactor pin 76 is not in contact with any of the other segments, all the inputs of priority encoder 74 are high. Thus, as shown in the truth table in the Texas Instruments SN74HC148 data sheet, all of the output pins h2 h1, h0 of encoder 74 are high, giving a binary 111 on data output terminals 4, 3, 2, which combined with the binary one at output terminal 5 provides data output of 1111 at data output terminals 5, 4, 3, 2. This data signal from data output terminals 5, 4, 3, 2 (in FIG. 2 and FIG. 1), travels through plug 33 (referring now to FIG. 1), socket 34, data lines 5a, 4a, 3a, 2a to memory 35. As memory 35 continues to be clocked, the binary 1111 signal on its input pins is sent from the output pins, through output lines 5b, 4b, 3b, 2b to input pins d3, d2, d1, d0 of decoder 36. Refer to the function table in the Phillips Semiconductors 74HC42 product specifications in which designated inputs A3, A2, A1, A0, correspond respectively to input pins d3, d2, d1, d0 of decoder 36, and in which designated outputs Y0, Y1, Y2, Y3, Y4, Y5, Y6, Y7 correspond respectively to output pins A, B, C, D, E, F, G, H of decoder 36. The truth table in these specifications shows that with binary 1111 on the input pins d3, d2, d1, d0 of decoder 36, none of the eight output pins A, B, C, D, E, F, G, H are low, and thus there are no output pulses from eight-input NAND 49 to the CLK input of motor driver 37, and there is no rotation of the motors. The preceding description explains how the selection of the NULL position of encoding unit 1 causes the motors to remain stopped.

After the preceding initial period of the example of a recording session in which the motors are held in the stopped condition, the next step in the example is to rotate the motors by rotations of joystick 32. FIG. 3 shows joystick 32 after it has been rotated counter clockwise so that contact arm 64 is contacting adjustable stop 87, and segment R8 is contacting contactor pin 76. At the initial moment of this rotation of joystick 32, contact arm 64 and contactor pin 76 are in the position shown in FIG. 3, but immediately afterwards, as a result of segment R8 contacting contactor pin 76, feedback motor 70 starts to rotate to cause contact arm 64 (with contactor pin 76) to rotate counter clockwise toward the NULL segment. This occurs because when segment R8 comes in contact with contactor pin 76 it becomes grounded, thus bringing input k7 of encoder 74 low. This selection causes encoder 74 to output a binary 000 signal to terminals 4, 3, 2. Also, because the NULL segment is not grounded at this time, inverter 79 causes terminal 5 to be low. Thus a binary 0000 signal is present at terminals 5, 4, 3, 2. In the manner previously described, this binary code is recorded in memories 38, 35 (FIG. 1) and inputted to decoder 36 which selects output pin A, causing motor 9, and thus feedback motor 70 (FIG. 3) to run at the fastest speed. The positioning of contactor pin 76 at segment R8 causes finger 83 to be apart from contactor plate 82 which causes counterclockwise rotation of feedback motor 70 as previously described. This rotation is transmitted via connecting rod 68 to move contactor pin 76 away from segment R8 towards the NULL segment. While joystick 32 is held in the same position shown in FIG. 3, contactor pin 76 rotates to contact segment R7, which causes feedback motor 70 to continue counter clockwise rotation, but at a slower speed. Then contactor pin 76 continues to rotate further to make a sequence of contacts with segments R6, R5, R4, R3, R2, R1, reducing the speed of feedback motor 70 at each step. Finally contactor pin 76 contacts the NULL segment and rotation stops at the position shown in FIG. 4. Similar rotation to that shown with FIG. 3 occurs if joystick 32 is rotated clockwise to have segment L8 contact contactor pin 76, except that the resulting rotation would be in the opposite direction. Basically, any rotation of joystick 32 that moves the NULL segment away from contactor pin 76 will result in contactor pin 76 following the NULL segment to the new position to remake contact and go back to a stopped (NULL) condition. Such a following action occurs when any one of the sixteen active segments are caused to contact contactor pin 76 by rotations of joystick 32.

Figure 4:
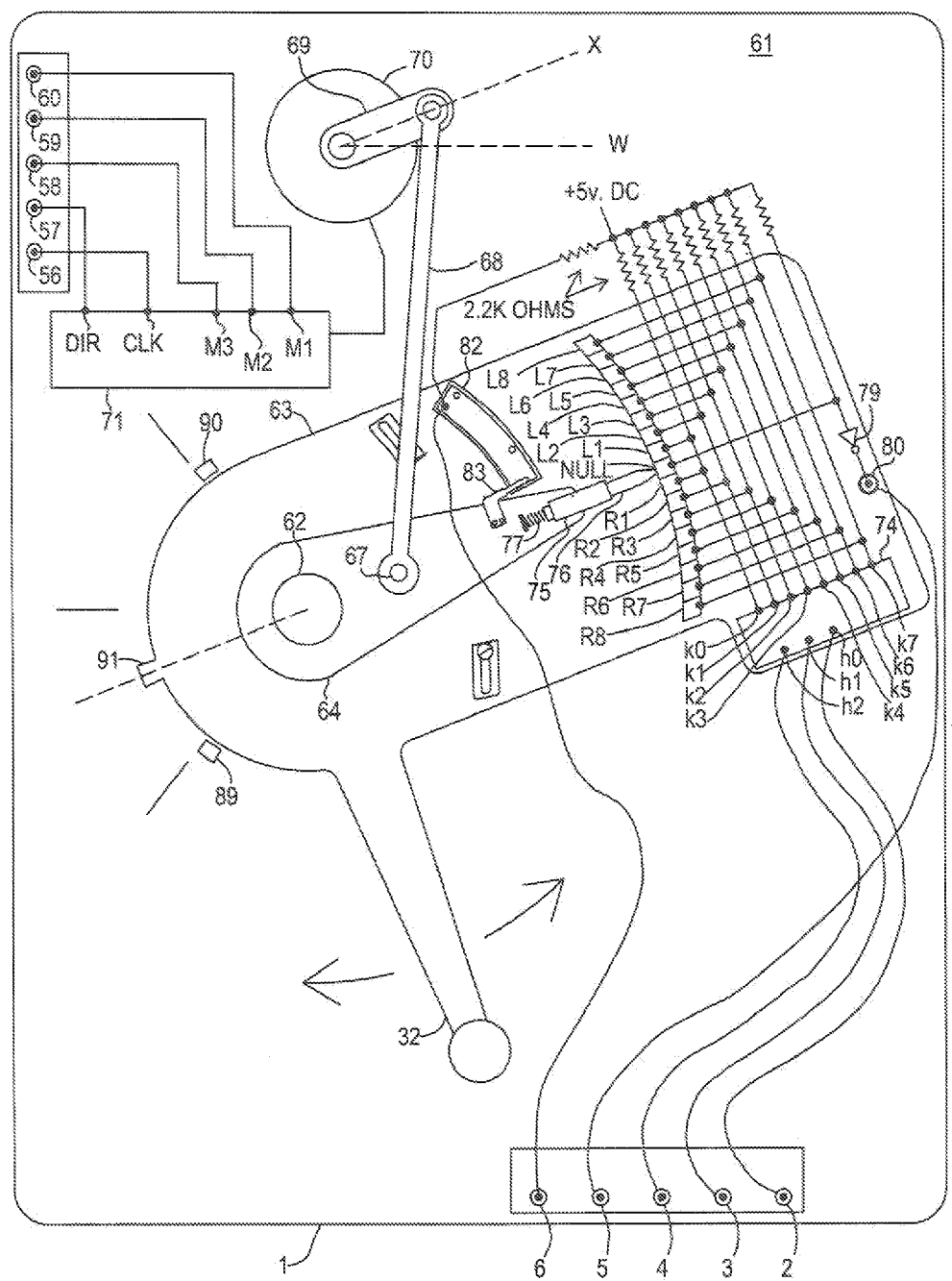
FIG. 4 is a combination mechanical and electrical schematic illustration of the joystick controlled encoding unit of FIG. 2 shown in another different rotational position.

FIG. 3 shows the position of contact arm 64 prior to the above described rotation caused by feedback motor 70 and control arm 69, with control arm 69 shown in position W. FIG. 4 shows contact arm 64 in the new position after being rotated by control arm 69, and with control arm 69 rotated from position W to position X. Since feedback motor 70 and axis motor 9 (FIG. 1) rotate in unison, the rotation of control arm 69 from position W to position X is matched by rotation of control arm 10 (FIG. 1) from position Y to position Z. In this manner, rotations of joystick 32 (FIG. 3) directly cause matching modulations of the speed and direction of rotation of axis motor 9, and cause the recording of data defining these modulations in memory 38 as previously described.

In the foregoing descriptions of the modulation of motor speed and direction with FIG. 3 and FIG. 4, processes were described by which joystick 32 is rotated to new positions and held there while contactor pin 76 followed to contact the NULL segment at the new positions. These simple descriptions are helpful in explaining the encoding unit functions. However, further to that, it must be explained that joystick 32 need not be held in a stationary position, but rather can continue to be rotated during the rotation of the motors. Referring to FIG. 2, a useful example would be to rotate joystick 32 clockwise at a speed identical to the speed produced when the motors are activated by pin G in FIG. 1 (i.e., the second lowest speed). Then, because contact pin 76 is designed to follow towards the NULL segment (which would then be moving away from it), contact pin 76 would be driven by feedback motor 70 to follow in this same direction. With joystick 32 continuing to be rotated, the encoding unit responds, controlling the speed of feedback motor 70 to match the rotation speed of joystick 32 (i.e., the second lowest speed). Then, contact pin 76 settles into a continuous contacting with segment L2, causing the motors to rotate clockwise at this same speed. This condition is sustainable within the limits of rotation of the rotating components. The same method of rotating joystick 32 to exact speeds can be employed at any one of the range of speeds. However, the example of the use of such exact speeds of joystick 32 is offered only for explanation purposes, and is not a practical option. A practical example would be for the operator to maintain rotation of joystick 32 at a clockwise speed somewhere between the second lowest and the third lowest speeds. Contact pin 76 then makes contact alternately between segments L2 and L3 during the rotation of joystick 32, and the resulting speed of the motors would be an average of the second lowest and the third lowest speeds, with the changing back and forth between these speeds being imperceptible because of the high clocking frequency.

Summarizing the above: The operator can rotate joystick 32 in either direction, at any speeds within the range of operation, either at constant speeds or at fluctuating or irregular speeds, and the motors will imitate the rotations of joystick 32. The data defining those rotations is recorded in memory 38 (FIG. 1) in the manner described.

The range of rotation of turntable 63 (FIG. 4) is restricted by stops 89 and 90, which engage stop pin 91 at the limits of its travel. A typical range of rotation (as illustrated) is 100°, (50° in either direction from the "zero" center position).

Optical Encoding Unit

Figure 5:
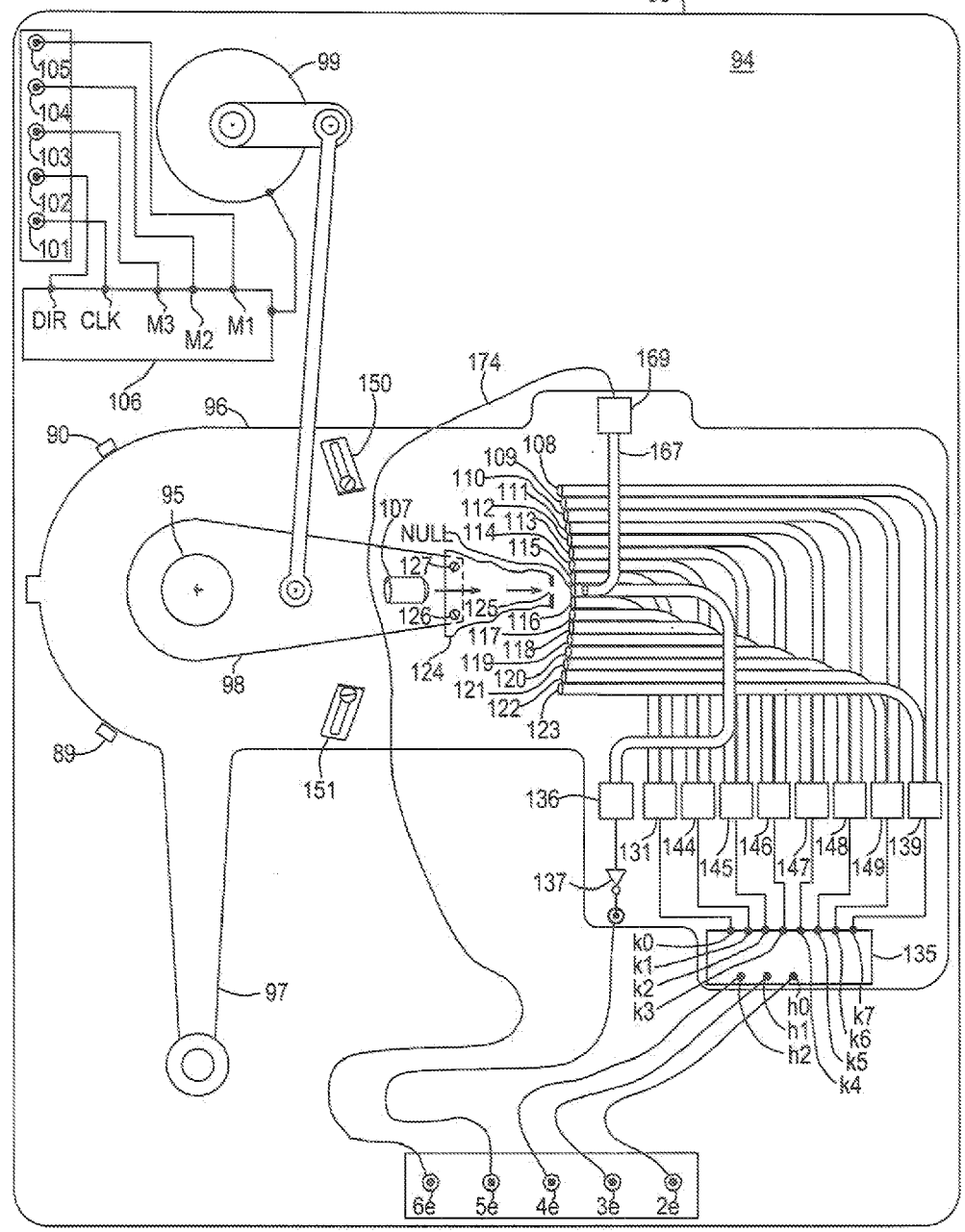
FIG. 5 is a combination mechanical and electrical schematic illustration of the joystick controlled encoding unit of FIG. 2 showing an alternative encoding unit using optical sensing of joystick movements.
Figure 6:
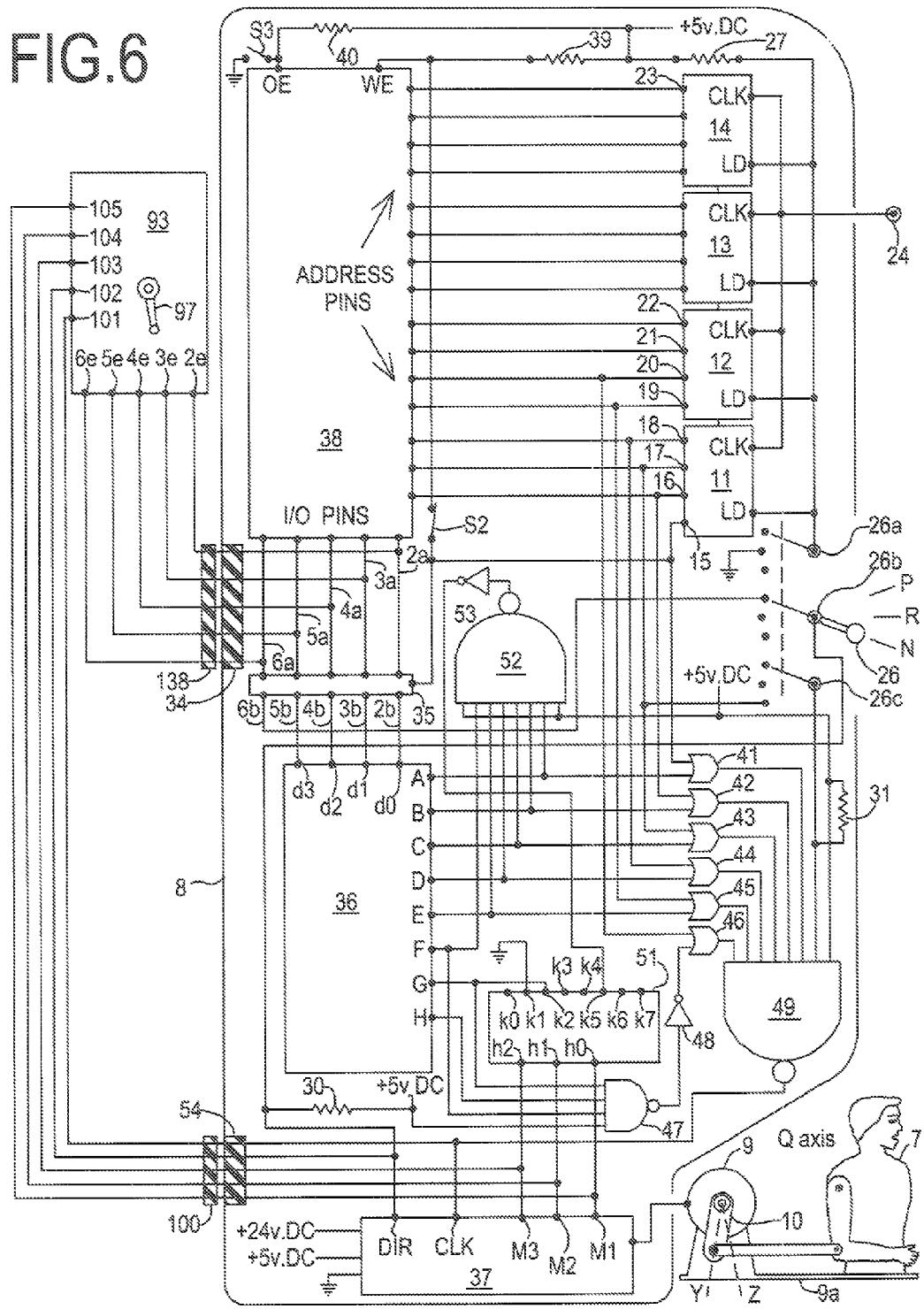
FIG. 6 is a schematic electrical circuit diagram of the basic control module for a single axis motor according to the present invention using the optical encoder of FIG. 5 according to the present invention.

FIG. 5 shows details of optical encoding unit 93, which can be used as an alternate to encoding unit 1 (FIGS. 1, 2, 3, 4) for the control of module 8. Encoding unit 93 functions similarly to encoding unit 1, except that instead of using an electrical contact pin for selecting the various speeds of the motors, a controlled light beam illuminates fiber optic pieces which activate the selections. FIG. 6 is a view in which module 8 is shown illustrated identically to its illustration in FIG. 1, but in which optical encoding unit 93 replaces encoding unit 1 to transmit data to module 8 for controlling the rotation speed and direction of the motors.

Encoding unit 93 (FIG. 5) uses metal base 94 for mechanical support of components. Axle 95 is attached to, and is perpendicular to metal base 94. Optics turntable 96 rotates about axle 95 and is manipulated by joystick 97. Optical selector arm 98 also rotates about axle 95 and rotates independently from optics turntable 96. Optics feedback motor 99 is similar to feedback motor 70 (FIGS. 2, 3, 4), and powers rotation of optical selector arm 98 in the same manner that feedback motor 70 powers rotation of selector arm 64 (FIGS.

2, 3, 4). Motor 99 rotates in unison with axis motor 9 (FIG. 6). This rotation in unison is achieved by coupling the inputs CLK, DIR, M3, M2, M1 of driver 37 (FIG. 6), through socket 54, plug 100, and terminals 101, 102, 103, 104, 105, to the CLK, DIR, M3, M2, M1 inputs of driver 106 (FIG. 5).

Referring to FIG. 5, a light source 107 (for example, an incandescent or LED bulb) is mounted on selector arm 98. Fiber optic pieces 108, 109, 110, 111, 112, 113, 114, 115, NULL, 116, 117, 118, 119, 120, 121, 122, 123 are mounted on optics turntable 96 so that the input ends of all of these optical fibers constitute a receiving array facing light source 107 and lying in an arc concentric to axle 95 of arm 98. In the following disclosure these combined input ends are referred to as the "optics array". Each of the fiber optic pieces in the array is in touching contact with its adjacent pieces. A beam of light from light source 107 illuminates the input ends of any fiber optic pieces to which it is directed. Such directing of the light beam depends on the relative axial positions of the fiber optics array and light source 107, which positions are the result of rotations of optical selector arm 98 and optics turntable 96. As each one of the fiber optic pieces in the fiber optics array is selectively illuminated, the various rotation speeds of the motors are selected. Illumination of piece 115, or piece 116, selects the lowest speed. Illumination of pieces 108 or 123 selects the highest speed; and selective illuminations of the pieces in intermediate locations select intermediate speeds. The methods of achieving these speeds by these selections are described in detail below.

Optic pieces 108, 109, 110, 111, 112, 113, 114, 115 are used for clockwise rotation of the motors, and pieces 116, 117, 118, 119. 120, 121, 122, 123 are used for counter clockwise rotation. The methods of defining the direction of motor rotation are shown in detail later. FIG. 5 shows the light beam from light source 107 illuminating the NULL fiber optic piece, which causes the motors to be stopped, as described in detail below. Screen 124 has an opening or gap 125 which controls the width of the light beam traveling from light source 107 to the fiber optic piece input ends. Screen 124 is secured to selector arm 98 by screws 126 and 127, and is shown partially cut-away in FIG. 5, due to lack of drawing space, but is fully shown in FIG. 7. Refer now to FIG. 7, in which screen 124 is shown, attached to selector arm 98 by screws 126, 127, and in the position for illumination of the NULL fiber optic piece. A tall opaque vertical panel 129 and a short vertical opaque panel 130 are extensions of screen 124, and they allow a beam of light from light source 107 to pass between them, through opening or gap 125, to illuminate the NULL fiber optic piece. These opaque panels also shield the other fiber optic inputs in the fiber optics array from illumination at that time. Screen 124 is typically constructed of thin sheet-metal, but can be of any other suitable opaque material. FIG. 7a is a frontal view showing the alignment of the fiber optic array with panels 129 and 130 in the position for illumination of the NULL fiber optic through gap 125, with the other fiber optic pieces blocked from illumination.

FIG. 7b shows the optic array after counter clockwise rotation of joystick 97 (and thus the optics array), with the gap 125 between panels 129 and 130 in the position for illumination of the 116 fiber optic piece, and with the other fiber optic pieces blocked from illumination. This position occurs when the optics array is rotated, relative to screen 124 (and optical selector arm 98 to which it is attached), by counter clockwise rotation of joystick 97 (FIG. 7). A short distance before rotating to this position, fiber optic piece 116 would have been illuminated, but no rotation of the motors would occur at that time because the NULL fiber optic piece was still partially illuminated through gap 125; and the selection of NULL overrides all other selections Then, when rotation reaches the position where NULL is completely dark, the illumination of piece 116 will take effect and the motors will rotate at the slowest speed in a counter clockwise direction.

It is important that light beam gap 125 is wide enough so that when it is moving from one fiber optic piece to another it continues illumination of the one piece until after it illuminates the other piece. A typical width of opening 125 (as shown) is equal to one third of the diameter of one of the fiber optic pieces. When two adjacent fiber optic pieces are thus illuminated at the same time, the binary word associated with the higher priority input (i.e., higher speed) is present at the output of priority encoder 135 (FIG. 5).

Refer now to FIG. 5. As previously described, either one of fiber optic pieces 115 or 116 can be illuminated separately to activate the lowest speed of the motors. Fiber optic piece 115 is illuminated when joystick 97 is rotated in a clockwise direction from NULL, and fiber optic piece 116 is illuminated when joystick 97 is rotated in a counter clockwise direction from NULL. At an initial clockwise rotation of joystick 97 to a set position, optical selector arm 98 (and thus light source 107) are momentarily stationary, providing a relative positioning that allows the illumination of fiber optic piece 115. However, immediately upon such illumination, motor 99 is activated, to rotate selector arm 98 (and thus light source 107) away from the position that allows such illumination, and back into the NULL position, thus stopping the motors. The described clockwise rotation of the motors induced by rotation of joystick 97 is thus self canceling. However if joystick 97 is rotated in a continuing motion, the motors will continue rotation until rotational movement of joystick 97 is stopped, at which time rotation of the motors continues briefly, until the rotation causes engagement of the NULL position, as previously described, and the motors will stop.

The output ends of fiber optic pieces 115 and 116 are placed side by side in optics receiver 131 so that if either optic piece is illuminated by light source 107, optics receiver 131 (described in detail below) will be illuminated and respond by sending a low signal from its output to the k0 input pin (i.e., the lowest priority input) of priority encoder 135 (for example, 74HC148 encoder identical to encoder 74 in FIGS. 2, 3, 4). According to the previously referenced Texas Instruments SN74HC148 data sheet, the k0 input will produce binary 111 signal on its output pins h2, h1, h0, and on data output terminals 4e, 3e, 2e; thus presenting a part of the data needed to define the slowest rotation speed of the motors. The method of defining the direction of rotation is described below. When joystick 97 is rotated in this manner to produce the binary 111 signal (by illuminating either of optic pieces 115 or 116), it also rotates to cause the NULL optic piece to go dark, causing optics receiver 136 (which is identical to receiver 169 described in detail below in reference to FIG. 10) to output high to inverter 137. When inverter 137 receives a high input it sends a low output to output terminal 5e. The resulting output data on terminals 5e, 4e, 3e, 2e is binary 0111, which defines the slowest speed of rotation of the motors. The binary 0111 data signal from data output terminals, 5e, 4e, 3e, 2e (in FIG. 5 and FIG. 6), travels through plug 138 (referring now to FIG. 6), socket 34, data lines 5a, 4a, 3a, 2a, to memory 35. As memory 35 continues to be clocked, the binary 0111 signal on the input pins is sent from the output pins, through output lines 5b, 4b, 3b, 2b to input pins d3, d2, d1, d0 of decoder 36. Reference is made to the function table in the Phillips Semiconductors 74HC42 decoder product specifications in which designated inputs A3, A2, A1, A0 correspond to input pins d3, d2, d1, d0 of decoder 36, and in which designated outputs Y0, Y1, Y2, Y3, Y4, Y5, Y6, Y7 correspond to output pins A, B, C, D, E, F, G, H of decoder 36. The truth table in the product specifications for these components shows that with the binary 0111 signal on the input pins d3, d2, d1, d0 of decoder 36, output pin H goes low, which causes the motors to rotate at the lowest speed.

Fiber optic pieces 108 and 123 are used to activate the highest motor speed in a similar manner. The output ends of fiber optic pieces 108 and 123 are placed side by side in optics receiver 139 (which is identical to receiver 131), so that if either optic piece is illuminated by light source 107, optics receiver 139 will send a low signal to input pin k7 (the highest priority input) of priority encoder 135. Selection of input pin k7 will produce a binary 000 signal on its output pins h2, h1, h0, and on data output terminals 4e, 3e, 2e. At the same time, since there is no illumination of the NULL optic piece, a binary 0 signal is present at output terminal 5e, resulting in binary 0000 signal being present on data output terminals 5e, 4e, 3e, 2e. When binary 0000 is presented at the input pins d3, d2, d1, d0 of decoder 36 (FIG. 6), in the same manner described with the slowest speed, output pin A is selected, and the motors will run at the highest speed. The method of defining the direction of rotation is described below.

To activate the intermediate motor speeds, the other matching pairs of fiber optic pieces are similarly placed in optics receivers 144, 145, 146, 147, 148, 149 (FIG. 5), and these receivers individually send their outputs to input pins k1, k2, k3, k4, k5, k6 of priority encoder 135, causing appropriate binary word signals to be present at output pins h2, h1, h0, and data output terminals 4e, 3e, 2e. All of these optics receivers are identical to optics receiver 131.

Adjustable stops 150 and 151 are used to restrict the travel of selector arm 98 relative to turntable 96.

Receiver 131

Referring to FIG. 8, in which receiver 131 is shown in detail light from either of the fiber optic pieces 115 or 116 causes an increase of conductance of phototransistor 154 (for example, a Panasonic PNZ121S type). This high conductance is sensed by amplifier 156 which responds with a low signal at the output of receiver 131, as described above. Optics receivers 139, 144, 145, 146, 147, 148, 149 (FIG. 5) are identical to receiver 131.

Amplifier

FIG. 9 shows details of amplifier 156 and its use of phototransistor 154. Phototransistor 154 and resistor 157 (for example, a 1 Megohm resistor), form a bridge circuit, with current flowing through it, from +5 v. DC to ground. Voltage reference point 158 is connected to the base of transistor 159 (for example, a 2N 4403). When phototransistor 154 is illuminated its conductance is high, which brings the voltage at reference point 158 (and the base of transistor 159) low. The low base voltage causes a high collector to emitter resistance in transistor 159, which increases emitter voltage under the influence of resistor 160 (for example, a 50 K ohms resistor). Increased emitter voltage is thus applied to the input of Schmitt trigger inverter 161 (for example, a 74HC14 IC) which presents a low state at the output of amplifier 156. When phototransistor 154 is not illuminated its conductance is low, which causes a higher voltage at reference point 158, and thus a high state (i.e., binary 1) output of amplifier 156. The snap action of Schmitt trigger inverter 161 ensures a positive changeover.

Rotation Direction

Refer now to FIGS. 7, 7a, and 7b. Fiber optic piece 167 is mounted above, and attached to, the fiber optics array, and is used to provide the data to determine rotational direction of the motors, such as when either one of fiber optic pieces 115 or 116 is illuminated. When joystick 97 is rotated counter clockwise to cause illumination of fiber optic piece 116, it causes the motors to rotate at the lowest speed, as described above, but it also causes fiber optic piece 167 to rotate along with the fiber optics array (to which it is attached) into a position where high panel 129 is blocking the light beam from light source 107 to fiber optics piece 167. With no illumination of optics piece 167 the motors are caused to rotate counter clockwise as follows: The blocking of the light beam to fiber optic piece 167 by counter clockwise rotation of joystick 97 causes receiver 169 to go dark. FIG. 10 shows details of receiver 169. When receiver 169 goes dark it causes a decrease of conductance of phototransistor 170. This decrease is sensed by amplifier 172, causing its output (and the output of receiver 169) to go high. Amplifier 172 is identical to amplifier 156 in FIG. 9. This high output from receiver 169 is sent by flexible wire 174 (FIGS. 5 and 7) to data output terminal 6e. Refer now to FIG. 6 where terminal 6e is also represented, and then continue tracing the high state from terminal 6e through plug 138, socket 34, data line 6a, memory 35, output line 6b, and switch 26b to the DIR input of motor driver 37, which is configured for counter clockwise rotation of the motors when receiving a high signal on its DIR input. The preceding describes how any counter clockwise rotation of joystick 97 causes a counter clockwise rotation of the motors.

When joystick 97 rotates clockwise (FIGS. 7 and 7a) it causes optic piece 167 to remain clear of high panel 129 and thus remain illuminated, providing a low signal at the DIR input, and clockwise rotation of the motors. This same control of motor rotation direction is valid for all motor speeds.

FIG. 7 and FIG. 7b are frontal views showing the alignment of optic piece 167 relative to the optics array and tall vertical panel 129. A typical alignment (as shown in FIG. 7a) has a vertical edge of panel 129 aligned with a tangent to the circumference of optic piece 167 when opening 125 is aligned centrally with the NULL optic piece. In this shown position, panel 129 keeps optic piece 167 dark. Counter clockwise rotation of the optics array to illuminate piece 116 (as shown in FIG. 7b) causes optic piece 167 to remain dark. When the optics array is rotated clockwise, so that optic piece 115 is illuminated, optic piece 167 is illuminated, causing clockwise rotation of the motors.

Null Selection

In FIG. 5 priority encoder 135 has only eight inputs and a 3-bit binary output. The eight inputs are needed to encode the outputs from the eight receivers 131, 139, 144, 145, 146, 147, 148, 149; therefore, to provide the additional encoding capacity needed to include the NULL position in a binary word defining the required speeds, additional encoding is provided as follows: FIG. 5 shows rotational positions of optical selector arm 98 and optics turntable 96 that result in illumination of the NULL fiber optic piece by light source 107. When the NULL fiber optic piece is thusly illuminated it provides illumination of receiver 136 (which is identical to receiver 169 in FIG. 10). When illuminated, receiver 136 responds by sending a low signal to inverter 137, which sends a high signal to output terminal 5e, thus providing a binary 1 signal as the most significant bit of a four-bit word at the output terminals 5e, 4e, 3e, 2e when NULL is illuminated. Since none of the other fiber optic pieces is illuminated at this time, all of the inputs of priority encoder 135 are high; therefore, according to the truth table in the Texas Instruments SN74HC148 data sheet, a binary 111 signal is present at the output pins h2, h1, h0 of priority encoder 135. Thus the complete speed control output on data output terminals 5e, 4e, 3e, 2e is binary 1111. This data signal from data output terminals 5e, 4e, 3e, 2e (in FIG. 5 and FIG. 6) travels through plug 138 (referring now to FIG. 6), socket 34, data lines 5a, 4a, 3a, 2a to memory 35. As memory 35 continues to be clocked, the 1111 data on the input pins is sent from the output pins, through output lines 5b, 4b, 3b, 2b to input pins d3, d2, d1, d0 of decoder 36. Reference is now made to the function table in the "Phillips Semiconductors 74HC42 product specifications", in which designated inputs A3, A2, A1, A0 correspond to input pins d3, d2, d1, d0 of decoder 36, and in which designated outputs Y0, Y1, Y2, Y3, Y4, Y5, Y6, Y7 correspond to output pins A, B, C, D, E, F, G, H of decoder 36. The truth table in the specifications for these components shows that with binary 1111 on the input pins d3, d2, d1, d0, none of the output pins is low and thus there is no output from eight-input NAND 49 to the CLK input of motor driver 37, and no rotation of the motors. This is the same control method previously described, when stopping the motors by contact of the NULL segment with contact pin 76 (FIGS. 2, 3, 4), thus preventing rotation of the motors. When optical selector arm 98 and optics turntable 96 (FIG. 5) are in the positions that allow no illumination of the NULL fiber optic piece, the resulting (binary 0) significant bit at output terminal 5e, and input d3 of decoder 36 (FIG. 6), allows decoding inputs (shown in the above-mentioned truth table) that allow the motors to rotate at the various speeds.

Alternative Encoding Units—Comparison

The binary outputs from encoder 135 (FIG. 5), which result from rotations of joystick 97 (with optical encoding unit 93) are identical to the binary outputs from encoder 74 (FIGS. 2, 3, 4), resulting from rotations of joystick 32 (with encoding unit 1); even though different methods are used to convey the effects of joystick rotations. For example: A specific series of rotations of joystick 32 (with encoding unit 1) will produce a series of resulting rotations of the motors. Then, if plugs from encoding unit 1 are unplugged from sockets 34 and 54 (FIG. 1), and replaced by plugs from encoding unit 93 as shown in FIG. 6, the same series of rotations of joystick 97 will produce an identical series of rotations of the motors. Therefore, the descriptions of various functions of encoding unit 1 (provided above with reference to FIGS. 2, 3, 4) are valid descriptions of the same functions, should they be employed to rotate the motors with encoding unit 93 (in FIGS. 5, 6).

Detailed descriptions (provided in relation to FIG. 4) showed how the operator can rotate the joystick in either direction, at any of the speeds within the range of operation, either at constant speeds or at fluctuating or irregular speeds, and the motors will imitate the rotations of joystick 32. These descriptions are relevant to the encoding unit functions when using either the electrical contact encoding unit 1, or the optical encoding unit 93.

Slow Scan

Figure 11:
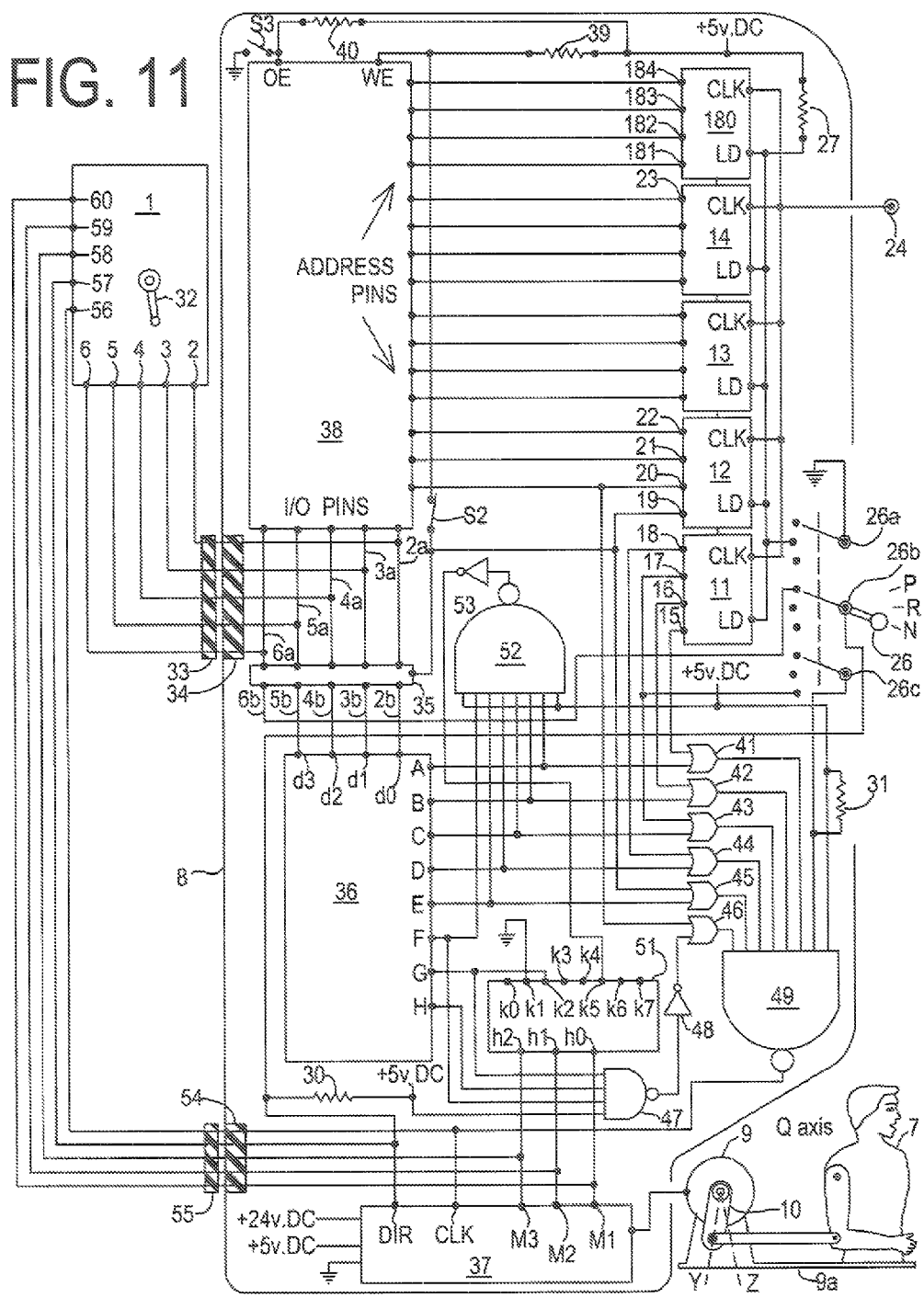
FIG. 11 is a schematic electrical circuit diagram of the basic control module for a single axis motor with alternative memory clocking.

Memories 35 and 38 (FIGS. 1 and 6) have been shown being clocked at the frequency of signal source 15 (960 Hz) to sample the motor control data for highest quality of motor movement definition. By clocking at a lower frequency, longer recording and playback time is available with a given size of storage memory 38, but with reduced definition. FIG. 11 shows a variation in which signals from the signal source 19 (60 Hz) clock the memories. Counter 180 provides additional signal sources 181, 182, 183, 184, for address connections to memory 38. As additional alternatives, signal sources 16, 17, 18 could be used to clock the memories in a similar manner. A good compromise between movement definition and playback time is the use of source 18 (120 Hz) which gives reasonable definition, with an extended playing time of 136.5 seconds.

Three Speed

Figure 12:
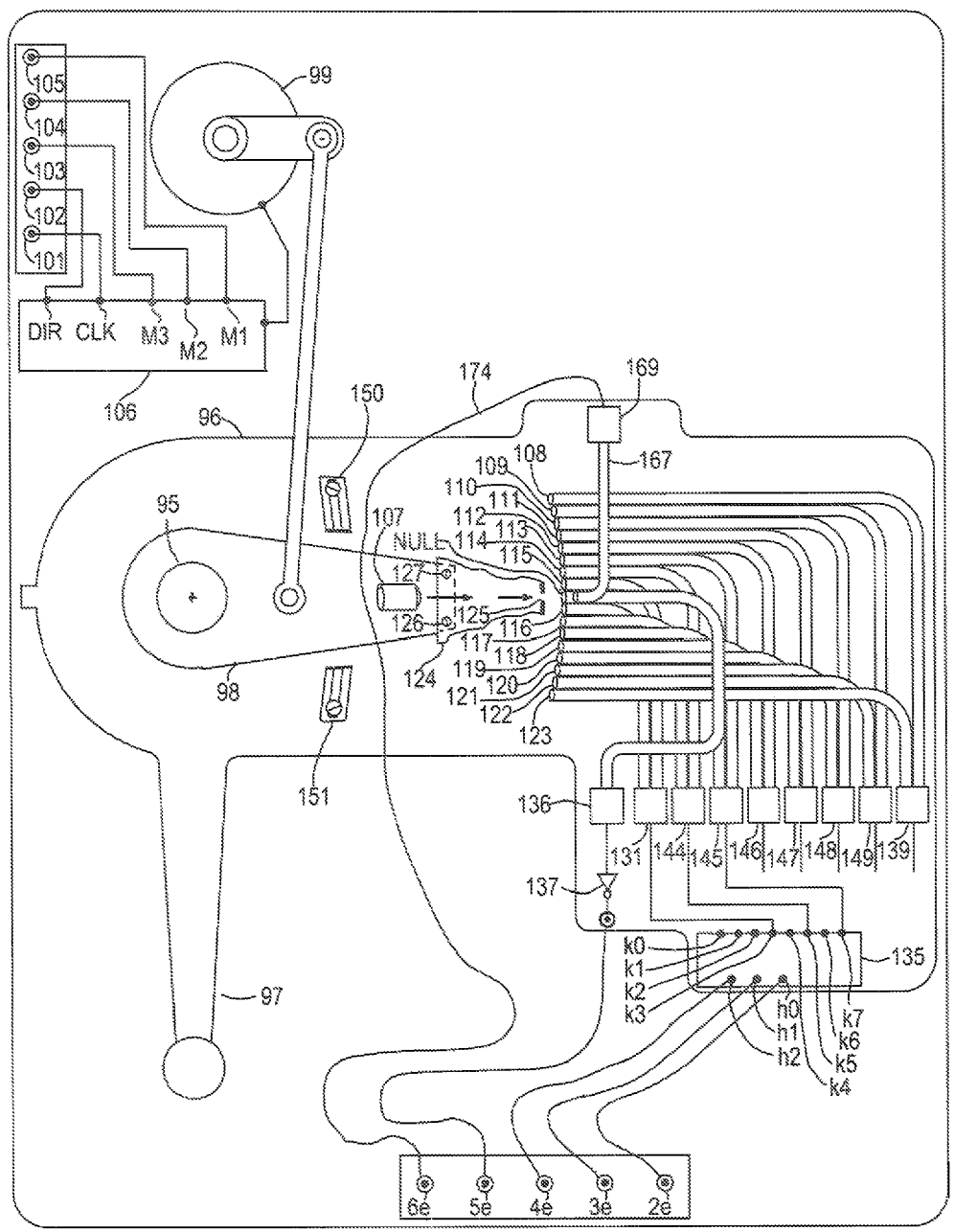
FIG. 12 is a combination mechanical and electrical schematic illustration of the joystick controlled encoding unit similar to FIG. 2 but with an alternative encoding unit arrangement having less speed selection.

Use of the full range of eight speeds (as described above) is necessary for providing smooth rotations of the arms, neck, etc., of character 7. However, with the rapid rotations of the jaw (e.g., when speaking), it is more important to have speed than smoothness. FIG. 12 shows a method in which only three speeds are used, giving a more direct control and faster response to the motion capture rotations applied to joystick 97 (as shown in FIG. 14).

Continuing with FIG. 12, there are only three selectable speeds in each direction in addition to the NULL selection. Optic pieces 115 and 116 engage input k3 of encoder 135 and provide a medium speed. Optic pieces 114 and 117 provide a medium high speed, and optic pieces 113 and 118 provide the fastest speed. Adjustable stops 150 and 151 are set inwards to restrict rotation to only these three positions. A variety of other speed options may be employed by different combinations. A lower number of speeds is useful with eye movements, facial expression, etc.

A similar adaptation to a lesser number of speeds can be made to the electrical contact encoding unit illustrated in FIG. 2 by modifying the wiring to encoder 74 and adjusting stops 86 and 87.

Stops and Slip Clutch

Before starting any recording or playback sessions it is necessary to set the position of the animated component of the animated FIG. 7 to a specific starting position so that this identical starting position can be duplicated in later sessions. A typical method is to run the motors of the axis in a specific direction against mechanical stops for an extended period of time, with a clutch mechanism slipping to absorb the excess motion. This places the animated component in a repeatable specific position which can be duplicated later. A simpler method would involve manually setting the animated components by hand to marked positions before each recording or playback session.

Figure 13:
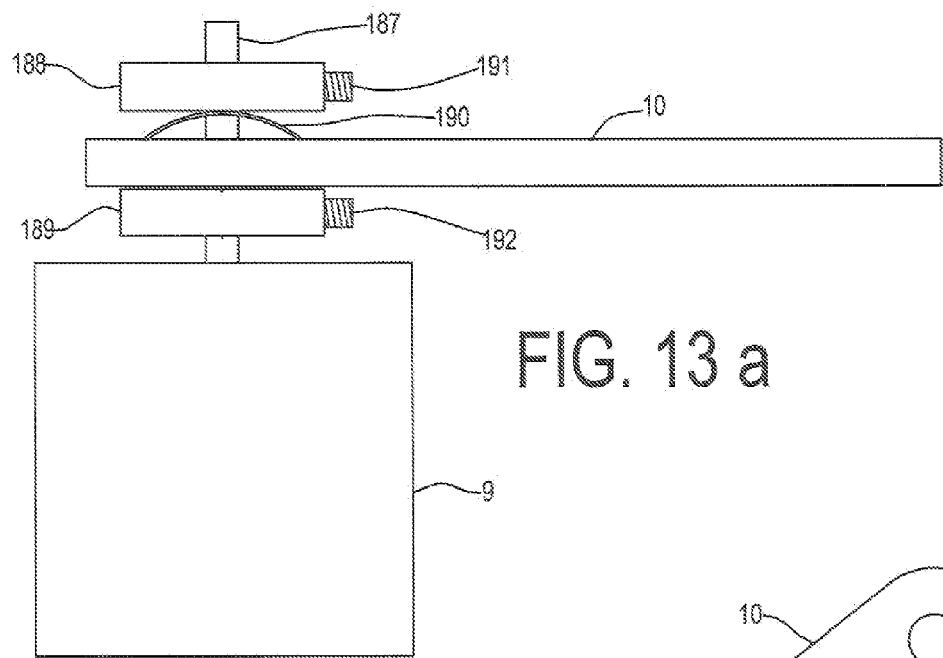
FIG. 13*a* is a diagrammatic view in elevation of a slipping clutch mechanism used in the present invention.
FIG. 13*b* is a top view in plan of the slipping clutch mechanism of FIG. 13*a*.
FIG. 13*c* is a view in perspective of a spring used in the slipping clutch mechanism of FIG. 13*a*.
Figure 13B:
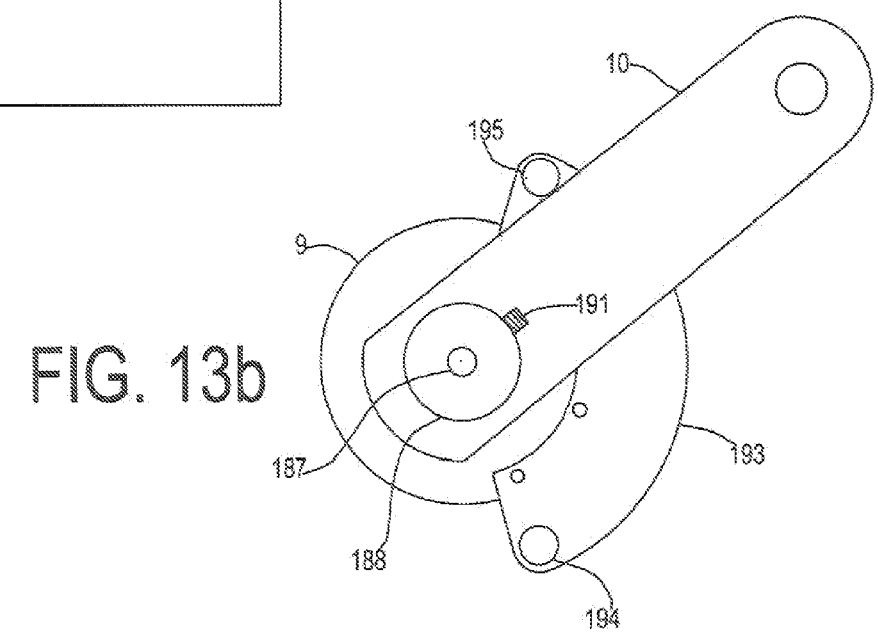
Figure 13C:
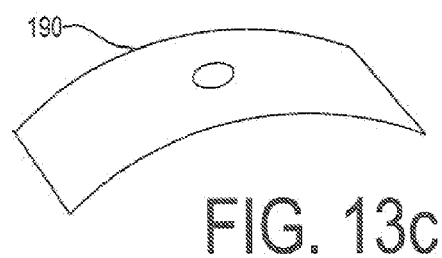

FIG. 13a shows axis motor 9 with motor shaft 187 driving control arm 10. Collar 189 is locked on shaft 187 by set screw 192. Collar 188 is forced towards control arm 10 to compress spring 190, and locked in position by set screw 191. In FIG. 13b stops 194 and 195 restrict control arm 10 to a range of motion and are attached to plate 193 which is mounted on axis motor 9. FIG. 13c shows spring 190. In operation, axis motor 9 (FIG. 13b) rotates counter clockwise and control arm 10 is restricted by stop 195. Axis motor 9 continues rotation with spring 190 (FIG. 13a) slipping against collar 188. This positioning method is controlled by ganged switches 26a, 26b, 26c in FIGS. 1, 6, 11, and 13. Before starting a recording (or playback) session switch 26b is set to the P (positioning) position, in which switch 26b interrupts the data controlling motor direction and allows resistor 30 to hold a high DIR input and keep the motors running in a counter clockwise direction. Also, in P position, switch 26c connects pulse source 17 to an input of NAND gate 49, providing a steady 240 Hz clocking to rotate the motors. Thus, while in P position, axis motor 9 (FIG. 13a) will continue rotating in a counter clockwise direction against stop 195, with spring 190 slipping against collar 191. When the ganged switches are taken out of the P position into the R (reset, standby) position, the motors stop, remain in the set position against stop, and switch 26b grounds the LD pins of the counters, resetting them and holding from any counting (see FIG. 1a and accompanying description). The axis now has the motor set in the predetermined starting position and, on standby, ready to set to the N (normal) position to start recording or playback. The feedback motors 70 and 99 (FIGS. 2, 3, 4, 5, etc.) have slipping clutches that are the same as shown in FIG. 13a. The range of motion allowed by stops 194, 195 (FIG. 13b) must be slightly greater than the typical 100° shown for joystick rotation with stops 89 and 90 (FIGS. 4 and 5). This prevents joystick rotations from causing the clutches to slip during normal recording. Spring 190 must be strong enough to provide the torque needed to rotate control arm 10 in its function of animating character 7 without slipping.

Master Clock

In FIG. 14 power is supplied through master switch 199 to pulse generator 200, (for example, a L555 astable multivibrator IC) with connections from its P7 and P8 (charging resistor pins) to variable resistor 201, and with connections from its P3 (output) pin to the clock (CLK) inputs of cascaded counters 202, 203, 204, 205, 206, 207, and to wire 210. Other needed components (discharge resistor, capacitor, etc.) are connected to pulse generator 200, and (for normal operation) variable resistor 201 is adjusted to produce a nominal pulse frequency of 15,360 Hz. Output pin 211 of (first) counter 202 provides a 7,680 Hz pulse frequency, and the output pin 212 of (last) counter 207 pulses at approximately 0.0073 Hz. The LD (load) pins of the counters are held high by 1K ohm resistor 214, and the counters can be cleared to zero by reset switch 215. Details of a similar reset feature are shown in FIG. 1a. Output 218 sends a pulse frequency of 1,920 Hz to module 220 (described below), and to clock terminal 24, which is the external signal source used to clock the counters of module 8 in FIG. 1, FIG. 6, FIG. 11, and FIG. 15. Clock terminal 24 is also used as a pulse source for additional such modules when used in multiple axis combinations.

Record/Replay Mode Switching

Module 8 as shown in FIG. 1, FIG. 6, and FIG. 11 is in the "RECORD MODE" which results from switch S2 being in the closed position and switch S3 being in the open position.

Figure 15:
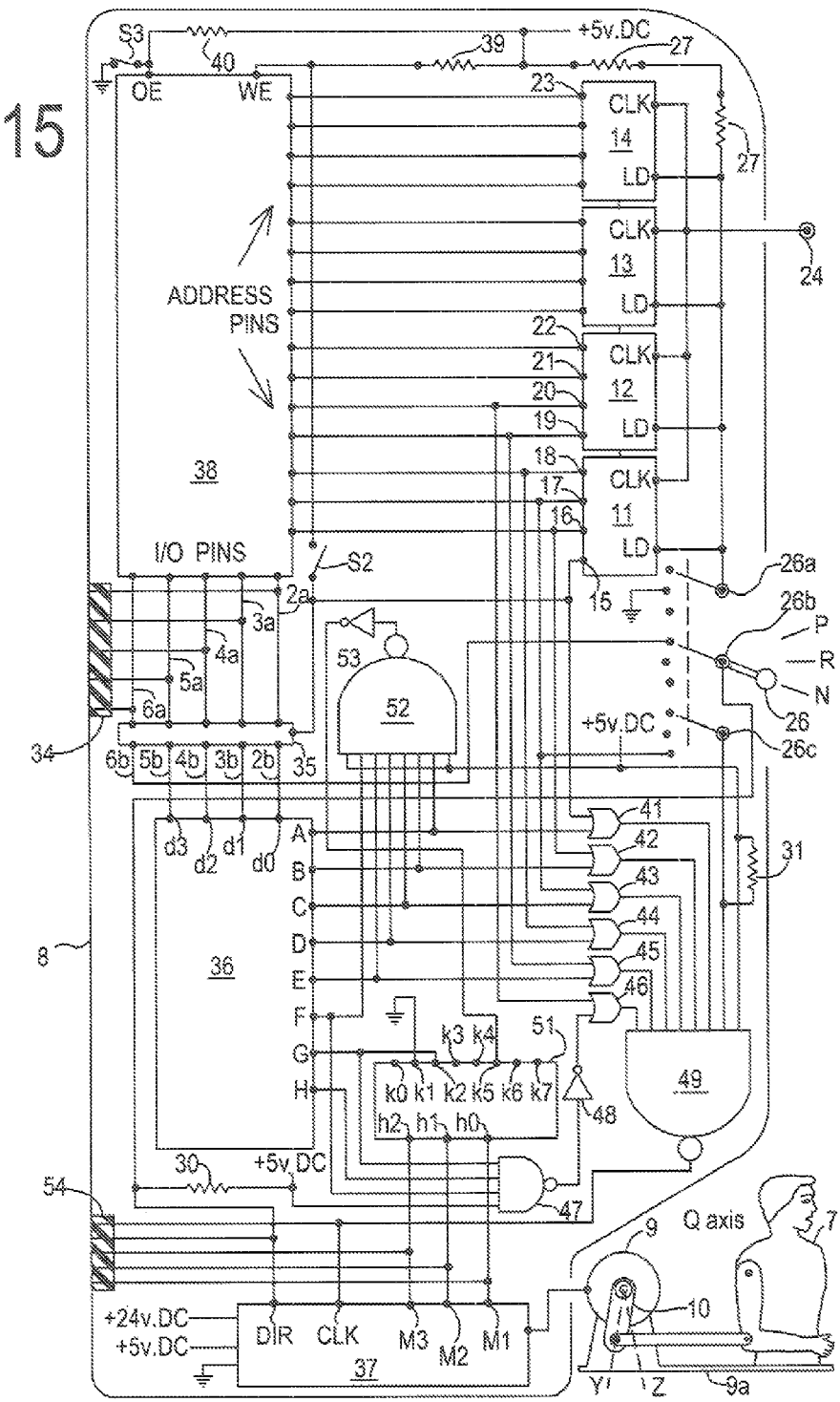
FIG. 15 is a schematic electrical circuit of an animatronic module in playback mode according to the present invention.

Module 8 as shown in FIG. 15 is in the "REPLAY MODE" which results from switch S2 being in the open position, and switch S3 being in the closed position. As described below in relation to other modules identical to module 8 (e.g., shown in FIGS. 15, 16, and 17), references are made to "RECORD MODE", and "REPLAY MODE", which references define the positions of switches S2 and S3 in the modules being described.

Procedure for Recording a Single Axis—(FIG. 1—Using Slip Clutch Positioning)

Turn master switch 199 (FIG. 14) "off". Set for "record mode" (FIG. 1) by turning switch S2 "on", and switch S3 "off". Plug in the encoding unit 1. Turn master switch 199 (FIG. 14) "on". Set switch lever 26 to P position until clutches start to slip. Set switch lever 26 to R position to remain in standby. Then, when ready, set switch lever 26 to N position and commence recording. When recording is completed, turn master switch 199 "off".

Procedure for Replaying, Single Axis (FIG. 15) (Using Slip Clutch Positioning)

Turn master switch 199 (FIG. 14) "off". Unplug the encoding unit 1. Set for "replay mode" (FIG. 15) by turning switch S2 "off", and switch S3 "on". Turn master switch 199 "on". Set switch lever 26 to P position until clutches start to slip. Set switch lever 26 to R position to remain in standby. When ready, set switch lever 26 to N position, and commence replaying.

With the memories being continuously clocked, the data coming from memory 38 is applied through memory 35 to control the operation of the motors in the same manner as in the recording function; with data now originating from memory 38, instead of encoding units 1.

Audio Recording

FIG. 14 shows the system used in the recording of an audio message, combined with the recording of a session in which jaw movements matching the spoken message are captured simultaneously. Outputs of counters 202, 203, 204, 205, 206, 207 are connected to the twenty one address pins of memory 219 (for example, a Dallas DS 1270 Y, NVSRAM, organized for 2,097,152 eight-bit words). The resulting maximum recording time, with clocking at 15,360 Hz, is approximately 137 seconds. Larger memories can be used for longer recording times. The LD (load) pins of the counters are held high by 1K ohm resistor 214, and the counters can be cleared to zero by reset switch 215. Details of this reset feature are shown in FIG. 1a (using switch 26a). Output 218 is used to send a pulse frequency of 1,920 Hz to module 220, which is identical to module 8 (in FIG. 1, FIG. 6, FIG. 11, and FIG. 15).

Module 220 is set in the "record mode" as described above. Pulses from output 218 provide clocking pulses to module 220 in the same manner that control module 8 is clocked in FIG. 1, FIG. 6, FIG. 11, and FIG. 15 by pulses from clock terminal 24. Switch lever 221 is identical to reset switch lever 26 (with associated ganged switches) which are shown and described above in connection with FIG. 1. Before starting a recording (or replay) session, switch lever 221 can be used to position the motors and reset the counters in module 220, and then set in the R (standby) position as described above. Or, if the motors are positioned by hand, switch lever 221 can be set to the R (standby) position while positioning. To start recording or playback, switch lever 221 is set to the N position.

Performer 222 (FIG. 14), wears a helmet 223 to which a lightweight support frame 224, supporting encoding unit 226, is attached. Encoding unit 226 may be substantially identical to encoding unit 1 (FIG. 1). Alternatively, an encoding unit identical to encoding unit 93 (FIG. 5) could be used. Control bar 228 rotates from pivot 230 and is in close contact with the underside of the performer's chin. Spring 232 ensures a constant contact with the chin. Connecting rod 233 connects control bar 228 to joystick 234 so that, as the performer speaks, the movements of his chin cause matching rotations of joystick 234. The data representing these rotations are recorded in module 220 in the manner described in connection with module 8 in FIG. 1. Cables from encoding unit 226 connect to plugs 236 and 238 which plug into sockets 240 and 242, thus connecting encoding unit 226 to module 220 in the same manner as with plug 33 into socket 34, and plug 55 into socket 54 in FIG. 6. Module 220 causes motor 244 to animate animatronics figure or character 246, so that an operator can monitor the movements; although a recording could be made effectively without motor 244 being connected.

At the same time these jaw movements are being recorded, the voice of the performer is being detected by microphone 248, amplified by amplifier 250 and inputted to ADC 252, a state of the art eight bit audio analog to digital converter (for example, a TLV571, IC, with associated circuitry and components). The 15,360 Hz pulses from wire 210 are applied through closed switch 253 to the WE (write) input of memory 219, and through plug 254 to ADC 252 as the sampling pulse input. The OE (output enable) input is held high by 2.2K ohm resistor 255 from 5 v DC. The eight-bit digital output from ADC 252 is sent through socket 257, plug 259, and cable 261 to the I/O input pins of memory 219. To begin recording, reset switch 215 is momentarily activated (with master switch 199 "off"), to clear the counters. Recording commences when switch 199 is reactivated. To synchronize the audio with the jaw movements in both recording and playback operation, the above described reactivation of switch 199 to commence audio operation, and the setting of switch lever 221 to the N position to commence jaw functions, must be done simultaneously. Alternatively, simultaneous switching can be achieved more easily by state of the art coupled switching devices.

Audio/Animation Replay Procedure

Refer to FIG. 16. Turn "off" master switch 199. Unplug plugs 236, 238. Unplug plug 259 from socket 257 and plug it into socket 265 of DAC 267. DAC 267 is a state of the art eight-bit audio digital to analog converter, for example a switched resistor type, or any other suitable type. The output from DAC 267 goes to amplifier 271 and speaker 273. Also, switch 253 must be open, and switch 269 closed. Module 220 must be set in "replay mode". Master switch 199 is turned "on" to commence replay. Positioning and synchronization methods are achieved as described above in connection with the recording operation.

Multiple Axes

FIG. 17 shows the arrangement of a previously recorded performance of an audio recording being played through speaker 273, with accompanying jaw movements of animated FIG. 246. Simultaneously, by using encoding unit 226, a recording is being made of movements in another axis that are coordinated with the performance. Encoding unit 226 is plugged into module 275 which is driving axis motor 277. For example, motor 277 could be used to provide arm gestures related to the speech. Module 275 is identical to module 220 and the previously described module 8. Encoding unit 226 is identical to encoding unit 1 in FIG. 1. At the same time, modules 279 and 281 are driving motors 283 and 284, providing pre-recorded performances of other axes of movement. These also help with the coordinating of the recording through module 275. In addition, more than one encoding unit can be used simultaneously in a multi-axis recording operation with multiple operators operating separate joysticks. More than one motion captures could be done simultaneously, in the same manner.

There is no limit to the number of additional modules (and axes) that can be combined in an animation. As many as twenty, thirty, or more might be used to animate a full character or figure. For the most part, modules are the same size (about the size of an index card and can be stacked together.

As an aid to editing by matching and synchronizing of multiple axis movements, the movement of all the axes can be played together in slow motion by adjusting variable resistor 201 to lower the pulse frequency of pulse generator 200. This slows down everything, and the recording of movements in an axis can also be made at the lower speeds, allowing more time to coordinate movements. Specifically, with a reduction of the frequency of the pulses from pulse generator 200 (FIG. 14) on clock terminal 24 (FIGS. 1, 14), the frequency of the timing pulse from source 15 (FIG. 1) is reduced. Also the frequencies of the outputs of the signal sources from counters 11, 12, 13 14 are reduced proportionally, resulting in a proportional reduction of the speeds of the motors.

Another advantage in this invention is that, for editing purposes, a replay can be run in reverse to reach a section of the recording that requires editing attention. At any time during a replay the up/down function of the counters can be used. If there is a questionable part of the recording, one can get to that part and then go back and forth to have a closer look at it and make corrections. This can also be done in slow motion. Details of the up/down feature are shown in FIG. 1a, using switch 28.

There are situations when using this invention in which changing from recording to replay involves manipulation of switches and plugs. This results in some complexity (especially with multiple axes). Relatively simple state of the art networks of relays controlled by single switches can be used for easier switching and plugging/unplugging operations.

Having described preferred embodiments of new and animatronic system with unlimited axes, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus for controlling an electric stepping axis motor wherein the said electric stepping axis motor responds to a plurality of different control settings corresponding to binary words of a predetermined set of binary data, said apparatus including:
   a memory containing a file for storing a plurality of said binary data;
   a pulse source for issuing each of said plurality of binary words from said memory at predetermined evenly spaced time intervals;
   an interface for decoding said binary words from said memory and controlling said electric stepping axis motor in accordance with the control settings corresponding to said binary words;
   a manually actuable joystick unit for selecting control setting commands consistent with desired speed and direction of said electric stepping axis motor, said joystick unit including a feedback stepper motor for interacting mechanically within said joystick unit to cancel previous control setting commands, said feedback stepper motor including:
   control wiring coupling said feedback stepper motor to rotate in unison with said electric stepping axis motor;
   an encoder for encoding said control setting commands into binary words at evenly spaced time intervals; and
   switching means for saving said binary words to said file in said memory at said evenly spaced time intervals.

2. The apparatus of claim 1 for controlling a plurality of individually actuable stepping motors for respective plural axes wherein said apparatus is replicated for each of said plural stepping axis motors.

3. The apparatus of claim 2 wherein each stepping motor controls animation in an animatronic system.

4. The apparatus of claim 3 further comprising means permitting selective manual adjustment of the frequency of said evenly spaced time intervals.

5. The apparatus of claim 4 further comprising means for aiding editing at slow speeds comprising means for matching and synchronizing multiple axis movements such that the movement of all the axes can be played together in slow motion.

6. The apparatus of claim 1 further comprising means permitting selective manual adjustment of the frequency of said evenly spaced time intervals.

7. The apparatus of claim 1 wherein the stepping motor controls animation in an animatronic system.

8. The apparatus of claim 1 wherein said binary data in said predetermined set of binary data correspond to respective speeds of said stepping axis motor, said apparatus further comprising means for varying the speed of said stepping axis motor by changing said binary data.

9. The apparatus of claim 1 further comprising means providing for selective manual adjustment of the speed of said stepping axis motor.

10. In an animatronic system, a method for recording and playing performances of individual axes of movement comprising:

during recording, continually commanding speeds and rotational directions of a stepping axis motor in response to manual movement of a joystick; and modifying the joystick commands by means of a feedback motor electrically coupled to the axis motor to mechanically interact with the joystick, wherein movement of said joystick to different positions selects respective commands in the form of binary words of a predetermined set of binary data stored in a memory, and further comprising;

issuing each of said plurality of binary words from said memory at predetermined evenly spaced time intervals;

decoding said binary words from said memory and controlling said electric stepping axis motor in accordance with the control settings corresponding to said binary words;

controlling a feedback stepper motor to interact mechanically with said joystick to cancel previous control setting commands, said step of controlling including:

coupling the feedback stepper motor to rotate in unison with said stepping axis motor;

encoding said control setting commands into binary words at evenly spaced intervals; and saving said binary words to said memory at said evenly spaced intervals.

11. The method of claim 10 further comprising selectively varying the speed of the stepping axis motor by selectively lowering the frequency of pulses that determine the axis motor speed.

12. The method of claim 10 further comprising:

editing a recorded performance by matching and synchronizing multiple axis movements, the axis movements being played together in slow motion by lowering the frequency of said evenly spaced intervals.

13. The method of claim 10 further comprising controlling motor controlling the stepping motor speed by controlling a system clock frequency.

14. An animatronic system comprising:

a stepping axis motor responsive to variable control signals for controlling animation of a character;

a memory for storing said control signals;

means for activating each of said plurality of control signals in said memory at predetermined evenly spaced time intervals;

an interface for decoding the activated control signals to control said stepping axis motor;

a manually actuable joystick unit for selecting control setting commands consistent with desired speed and direction of said electric stepping axis motor, said joystick unit including a feedback stepper motor for interacting mechanically within said joystick unit to cancel previous control setting commands, said feedback stepper motor including:

means coupling said feedback stepper motor to rotate in unison with said stepping axis motor;

an encoder for encoding said control setting commands into command signals at evenly spaced time intervals; and switching means for saving said command signals to said memory at said evenly spaced time intervals.

15. The apparatus of claim 14 for controlling a plurality of individually actuable stepping axis motors for respective plural axes wherein said apparatus is replicated for each of said plural stepping axis motors.

16. The apparatus of claim 15 further comprising means permitting selective manual adjustment of the speeds of said stepping axis motors.

\* \* \* \* \*